United States Patent
Yadav et al.

(10) Patent No.: US 10,862,958 B1
(45) Date of Patent: Dec. 8, 2020

(54) FLEXIBLE ASSOCIATIVITY IN MULTITENANT CLUSTERED ENVIRONMENTS

(71) Applicant: Veritas Technologies LLC, Santa Clara, CA (US)

(72) Inventors: Sunil Yadav, Maharashtra (IN); Pranav Sarwate, Madhya Pradesh (IN)

(73) Assignee: VERITAS TECHNOLOGIES LLC, Santa Clara, CA (US)

( * ) Notice: Subject to any disclaimer, the term of this patent is extended or adjusted under 35 U.S.C. 154(b) by 0 days.

(21) Appl. No.: 16/528,756

(22) Filed: Aug. 1, 2019

Related U.S. Application Data

(63) Continuation of application No. 15/395,109, filed on Dec. 30, 2016, now Pat. No. 10,389,802.

(51) Int. Cl.
  *G06F 15/177* (2006.01)
  *H04L 29/08* (2006.01)
  *H04L 12/24* (2006.01)

(52) U.S. Cl.
  CPC ........ *H04L 67/1034* (2013.01); *H04L 41/082* (2013.01); *H04L 67/10* (2013.01); *H04L 67/34* (2013.01)

(58) Field of Classification Search
  USPC .......................... 709/221, 220, 231
  See application file for complete search history.

(56) References Cited

U.S. PATENT DOCUMENTS

| | | |
|---|---|---|
| 2010/0088117 A1 | 4/2010 | Belden et al. |
| 2010/0302290 A1 | 12/2010 | Muschaweck |
| 2015/0163286 A1 | 6/2015 | Wen et al. |

*Primary Examiner* — Lan Dai T Truong
(74) *Attorney, Agent, or Firm* — Campbell Stephenson LLP

(57) ABSTRACT

Disclosed herein are methods, systems, and processes for determining a rigidity associated with a dependent application, wherein the rigidity can be a hard rigidity, a firm rigidity, or a soft rigidity, and wherein these rigidities refer to the dependency between the dependent application and a dependee application. In response to detecting a failure of the dependee application, the disclosure provides for performing an appropriate action with respect to the dependent application, wherein that action is based, at least in part, on the rigidity associated with the dependent application. In certain embodiments, the appropriate action can further be based on a locality parameter associated with the dependent application.

20 Claims, 18 Drawing Sheets

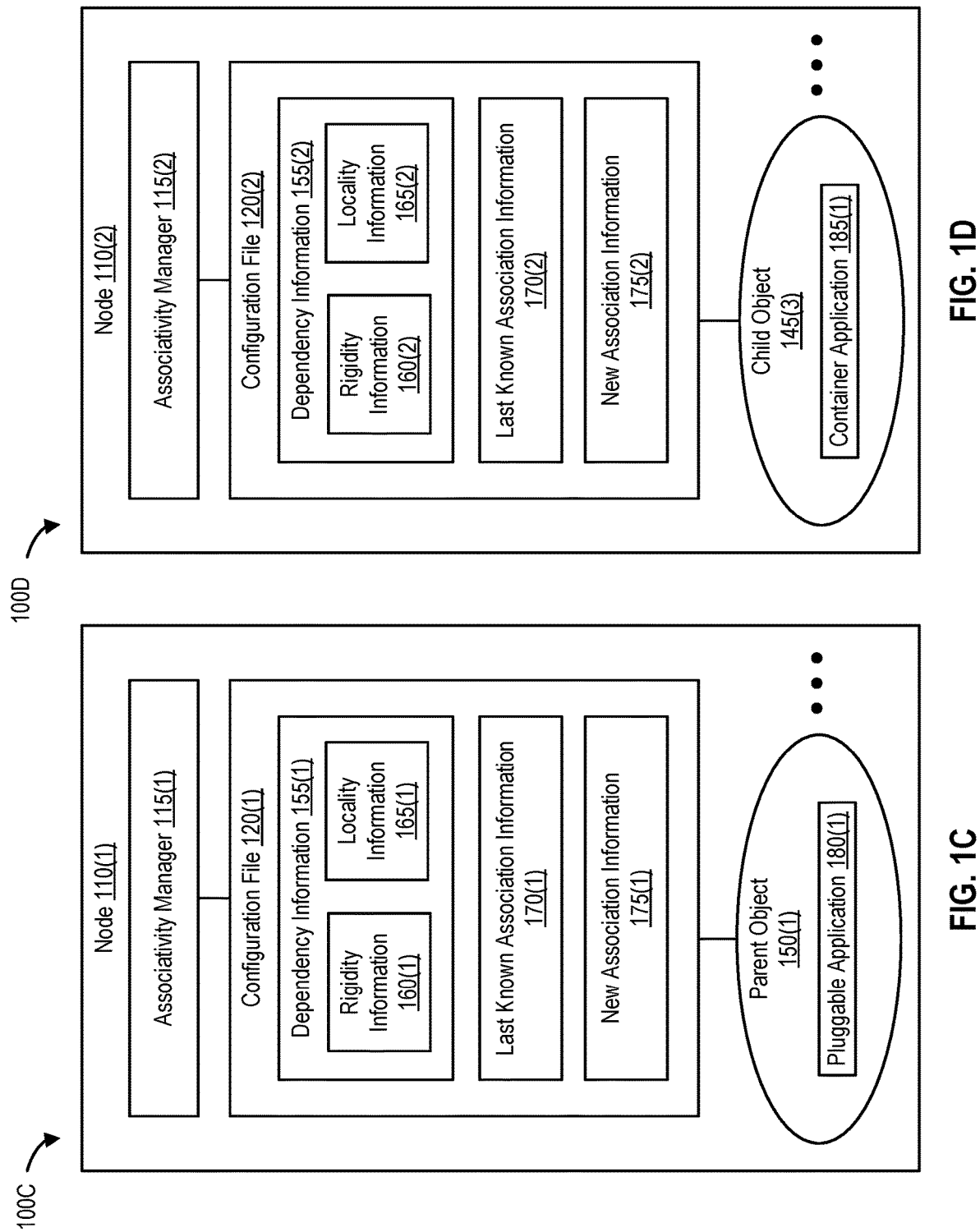

| Node Field 220 | Parent Object Field 225 | Configuration Files 120(1)-(N) (at time T and runtime) ||||| 
| | | Child Objects Field 230 | Current Association Field 235 | New Association Field 240 | Dependency Field 245 | Action Field 250 |
|---|---|---|---|---|---|---|
| Node 110(1) | Parent Object 150(1) | Child Object 145(1) Child Object 145(2) | None | Child Object 145(1) Child Object 145(2) | None | Child Object 145(1) |
| Node 110(2) | | Child Object 145(3) Child Object 145(4) | | Child Object 145(3) Child Object 145(4) | | |
| Node 110(1) | Parent Object 150(1) | Child Object 145(1) Child Object 145(2) | Child Object 145(1) | ~~Child Object 145(1)~~ Child Object 145(2) | Local | Child Object 145(2) |
| Node 110(2) | | Child Object 145(3) Child Object 145(4) | | Child Object 145(3) Child Object 145(4) | | |
| Node 110(1) | Parent Object 150(1) | Child Object 145(1) Child Object 145(2) | Child Object 145(1) | ~~Child Object 145(1)~~ Child Object 145(2) | Global; Child Object 145(3) has priority | Child Object 145(3) |
| Node 110(2) | | Child Object 150(3) Child Object 150(4) | | Child Object 145(3) Child Object 145(4) | | |
| ••• | ••• | ••• | ••• | ••• | ••• | ••• |

FIG. 2B

FLEXIBLE ASSOCIATIVITY IN MULTITENANT CLUSTERED ENVIRONMENTS

CROSS-REFERENCE TO RELATED APPLICATIONS

The present patent application is a continuation of U.S. patent application Ser. No. 15/395,109, filed on Dec. 30, 2016, entitled "Flexible Associativity in Multitenant Clustered Environments," which is incorporated by reference herein in its entirety and for all purposes.

FIELD OF THE DISCLOSURE

The present disclosure relates to providing flexible associativity for multitenant applications operating in clustered computing environments.

DESCRIPTION OF THE RELATED ART

A cluster is a distributed computer system with several nodes (e.g., computing devices) that work together as a single entity to provide processing power and storage resources. In a cluster, the processing load of the computer system is typically spread over more than one computer (or node), thereby eliminating (or minimizing) single points of failure. Therefore, applications and/or programs executing on the cluster can continue to function despite a problem with one computer (or node) in the cluster. Given their distributed nature, clusters can be useful in executing a multitenant application.

In a clustered environment, a multitenant application can include a single instance of a software program that runs on a computing device (e.g., a node), and is configured to serve multiple tenants. A single instance of a multitenant application can provide multiple tenants, a dedicated share of the multitenant application's software instance, including data, configuration, user management, and tenant functionality, among other resources. For example, a given application can support multiple applications, thus allowing multiple such applications to share a single application's memory and background processes, among other resources. In a clustered environment, such applications can also be moved between different associated applications.

SUMMARY OF THE DISCLOSURE

Disclosed herein are methods, systems, and processes to provide flexible associativity for multitenant applications operating in clustered computing environments. One such method involves updating a configuration file to produce an updated configuration file by generating new relationship information based on associations between a parent object and child objects, and storing the new relationship information in a metadata object. In this example, the method starts the parent object, which represents a dependent application, based on the updated configuration file. In this example, the child objects represent dependee applications.

In one embodiment, the method involves accessing current relationship information based on an association between the parent object and a child object other than other than the child object(s) used to generate the new relationship information, and storing the current relationship information in the metadata object.

In another embodiment, the method involves accessing the configuration file. In this example, the configuration file is associated with the dependent application and dependee applications, the dependent application and the dependee applications execute in a cluster, the configuration file includes at least the child object, the parent object, and the metadata object, the metadata object indicates the association between the parent object and the child object, and the metadata object includes dependency information.

In some embodiments, the cluster includes two or more computing devices, the parent object and child object execute on a computing device of the two or more computing devices, the parent object is a parent node object, and the parent node object represents a pluggable portion of the dependent application. In other embodiments, the child objects execute on the two or more computing devices, the child object(s) are child node object(s), and the child object represents a container portion of a dependee application.

In certain embodiments, updating the configuration file is performed at runtime on two or more computing devices in the cluster prior to starting the parent object based on the updated configuration file.

In certain other embodiments, the dependent application and the dependee applications execute on at least two computing devices in the cluster, the dependent application includes the pluggable portion, and the dependee applications include one or more container portions other than the container portion (e.g., represented by the child object).

In one embodiment, as part of the starting, the method migrates another child object other than the child object (e.g., used to generate the new relationship information) to another computing device based on the new relationship information and the current relationship information. In this example, the dependency information includes locality information indicating local locality or global locality, and rigidity information indicating hard rigidity, firm rigidity, and/or soft rigidity. As part of the migration process, the method determines whether the locality information indicates local locality or global locality, and whether the rigidity information indicates hard rigidity, firm rigidity, or soft rigidity.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

FIG. 1C is a block diagram 100C of node that executes a dependent application, according to one embodiment of the present disclosure.

FIG. 1D is a block diagram 100D of a node that executes a dependee application, according to one embodiment of the present disclosure.

FIG. 2B is a table 200B of a configuration file at a given point in time, according to one embodiment of the present disclosure.

Figure 1A:
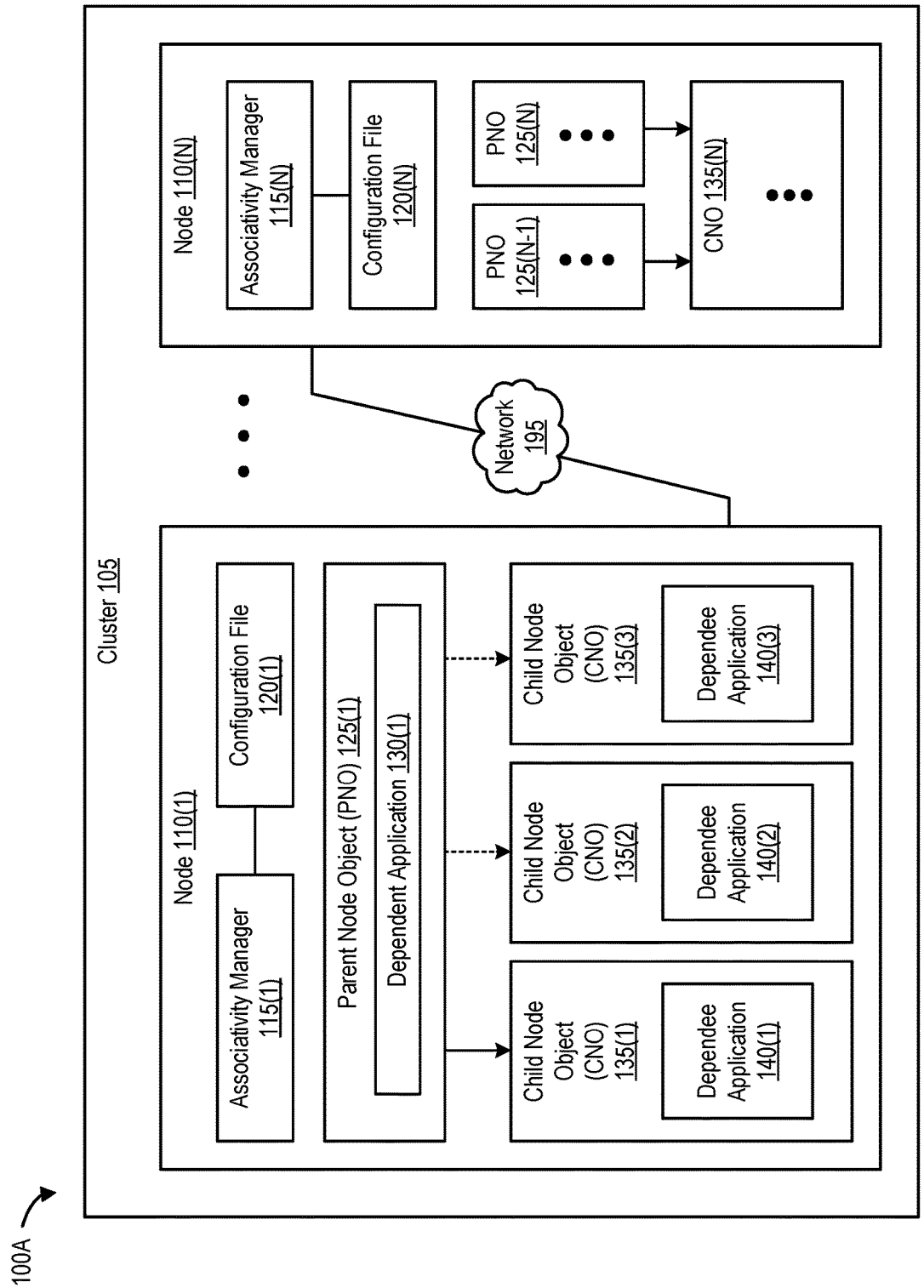
FIG. 1A is a block diagram 100A of a multitenant application that operates in a cluster, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

A cluster is a distributed computer system with several nodes (e.g., computing devices such as servers, and the like) that work together as a single entity to provide processing power and storage resources (e.g., to one or more applications executing on these nodes). In a cluster, the processing load of a given computer system is typically spread over more than one computer (or node), thereby eliminating (or minimizing) single points of failure. Therefore, applications that depend on each in some manner (e.g., dependent application(s) and dependee application(s)) can continue to function despite a problem with one computer (or node) in the cluster. As will be appreciated, clusters can be useful in supporting a multitenant application, such as, for example, in implementing applications that have a dependent application—dependee application(s) relationship.

In a clustered environment, a multitenant application can include a single instance of a software program (e.g., a dependee application) that runs on a computing device (e.g., a node), and is configured to serve multiple tenants (e.g., dependent applications). A single instance of a multitenant application can provide multiple tenants, a dedicated share of the multitenant application's software instance, including data, configuration, user management, and tenant functionality, among other resources. For example, a dependee application can support multiple dependent applications, in some embodiments allowing multiple dependent applications to share a single dependee application's memory and background processes, among other resources. As will be appreciated, in a cluster, a dependent application can also be moved between different dependee applications (e.g., between different nodes in the cluster).

In clustered environments, a dependee application provides dependent applications (which can also be implemented using virtual machines), a dedicated share of the dependee application, including data, configuration, user management, dependent application functionality, and among other properties. Dependent applications can be executed, implemented, and managed by the same node and/or host that executes the dependee application, or by some other node and/or host in the cluster.

The modeling of relationships between various dependent applications and dependee applications in a cluster involves parent objects and child objects. Parent objects and child objects execute applications or portions of an application (e.g., a multitenant application), and thus provide one or more resources. In a clustered environment, each parent object is a parent node object representation and each child object is a child node object representation of an application and/or a portion of a multitenant application. In certain clusters, the relationship between parent object(s) and child object(s) (e.g., storing relationship information, faulted node startup support, and the like), can be managed by cluster management software.

Generally speaking, an object, as used herein, is a variable, a data structure, a function, a method, a value in memory, an identifier, and the like. A parent object typically supports multiple child objects, and operates (or can operate) independently of a given child object (that the child object supports). Therefore, in traditional relationship modeling involving parent and child objects, a parent object can be configured to be independent of any child objects. However, in clustered environments that implement or execute one or more multitenant applications, it may be beneficial to reverse the roles between a parent object and child objects in some embodiments for relationship modeling (e.g., during startup, among other reasons).

In clustered environments that implement/execute multitenant applications, a child object takes on added importance (e.g., for starting a parent object, among other reasons). Cluster management software (e.g., a cluster management application) can control the behavior of a multitenant application that includes one container application (e.g., a database for metadata, and the like) and several pluggable applications (e.g., production databases, and the like). In such computing environments, the database for metadata functions as a dependent application that can serve multiple dependee applications (e.g., the production databases, and the like). For example, because the dependent application includes common metadata (e.g., metadata that can be shared between multiple dependent applications and/or between two or more nodes in a cluster, a single software instance of the dependent application can serve multiple dependee applications (e.g., because each dependee application served by a given dependent application can be configured to provision and serve disparate production data).

Therefore, in clustered environments that implement or execute one or more multitenant applications, and in one or more embodiments, it will be appreciated that it makes sense to represent a dependent application (e.g., a production database, a pluggable database, a pluggable application, or the like) as a parent object, and dependee applications (e.g., metadata supporting one or more database containers, application containers, or the like) as child objects.

A multitenant architecture can support the following example behaviors in clustered environments: (1) restart of a parent object on the same node under the same child object, (2) planned and unplanned plug/unplug of a parent object across child objects on the same node, and (3) planned and unplanned plug/unplug of a parent object across nodes in a cluster.

Unfortunately, modeling relationships between a parent object and a child object in such clustered environments is challenging for at least two reasons, among many. First, existing dependency constructs (e.g., runtime constructs) are rigid in nature. For example, in existing constructs, a given parent object can associate with only one child object, and association between the given parent object and additional child objects requires additional constructs—a laborious and computing resource intensive task. These additional constructs can consume valuable memory space, cannot be executed quickly (e.g., at runtime), and provide no mechanism to change the hard-coded relationship between a parent object and a child object.

Second, the nature of dependency relationships in clustered environments, as described above: (1) requires all child objects to be "up" (e.g., booted/online in a cluster) before a parent object can be started—a scenario that renders a parent object dependent on a child object, and (2) prevents a parent object (e.g., a dependent application) to change the parent object's association with child objects (e.g., dependee applications) at runtime (e.g., planned in case of node reboot or unplanned in case of faulted node) to take advantage of the multitenant architecture described above. Existing dependency constructs also provide no mechanism for dumping (e.g., storing and remembering) the last known association (e.g., a current association) of a parent object with a child object (e.g., to provide and/or provision for any favored and/or preferred dependency relationships between a parent object and child objects).

Example Systems for Flexible Associativity in Multitenant Clustered Environments FIG. 1A is a block diagram 100A of a multitenant application that operates in a cluster, according to one embodiment. It will be appreciated that the computing system(s) of FIG. 1A can be used to at least: (1) model multitenant applications in clustered environments, (2) generate a construct that allows flexible associativity of dependent applications, and (3) store last known association(s) of application dependencies.

FIG. 1A includes a cluster 105. Cluster 105 is a computing cluster that includes nodes 110(1)-(N). Nodes 110(1)-(N) can be any of a variety of different types of computing devices, including a server, personal computing device, laptop computer, cellular phone, or the like. Nodes 110(1)-(N) are communicatively coupled to each other via network 195. Any type of network and/or interconnection other than network 190 (e.g., the Internet) can be used to facilitate communication between nodes 110(1)-(N) in cluster 105.

It will be appreciated that the methods, systems, and processes described herein can be implemented independently by node 110(1), or by a combination of two or more nodes in cluster 105 (e.g., nodes 110(1) and 110(2)). Node 110(1) executes a cluster management application and associativity manager 115(1). Node 110(1) also manages and stores configuration file 120(1). In one embodiment, associativity manager 115(1) in part of the cluster management application. In another embodiment, associativity manager 115(1) operates independently. Configuration file 120(1) can be managed by associativity manager 115(1) and/or the cluster management application.

For example, in a distributed/replicated state machine-like cluster architecture (e.g., VCS), the cluster management application, associativity manager 115(1), and/or configuration file 120(1) can be implemented by every node in cluster 105. On the other hand, in a server-client (e.g., master-slave)-like cluster architecture, the cluster management application, associativity manager 115(1), and/or configuration file 120(1) can be implemented a master server that manages the configuration of cluster 105. In this example, associativity manager 115(1) can be implemented by a node that hosts the master server (e.g., a cluster server), and thus, need not be implemented as part of a node that represents a managed application. Therefore, associativity manager 115(1) can be a part of a cluster management application, or associativity manager 115(1) can be an independent process that supports the cluster management application.

As shown in FIG. 1A, node 110(1) implements a parent node object (PNO) 125(1), which is simply an object representation of a particular resource in cluster 105. For example, as shown in FIG. 1A, PNO 125(1) is a (parent) object representation of a dependent application 130(1) (e.g., a pluggable database, a pluggable application, or the like) that executes in cluster 105. Similarly, child node objects (CNOs) 135(1), 135(2) and 135(3) are (child) object representations of dependee applications 140(1), 140(2), and 140(3) (e.g., container databases, container applications, and the like) that executes in cluster 105. Such dependencies are depicted in FIG. 1A by the arrows from PNO 125(1) to CNOs 135(1)-(3).

Node 110(N) is configured comparably to node 110(1) and includes associativity manager 115(N) and configuration file 120(N) as well as PNO 125(N–1) and PNO 125(N). PNOs 125(N–1) and 125(N) can both have a dependency relationship with CNO 135(N). In one embodiment, PNO 125(1) can also be migrated over from node 110(1) to node 110(N). Associativity manager 115(1) can be implemented at a resource level or a service group level.

Figure 1B:
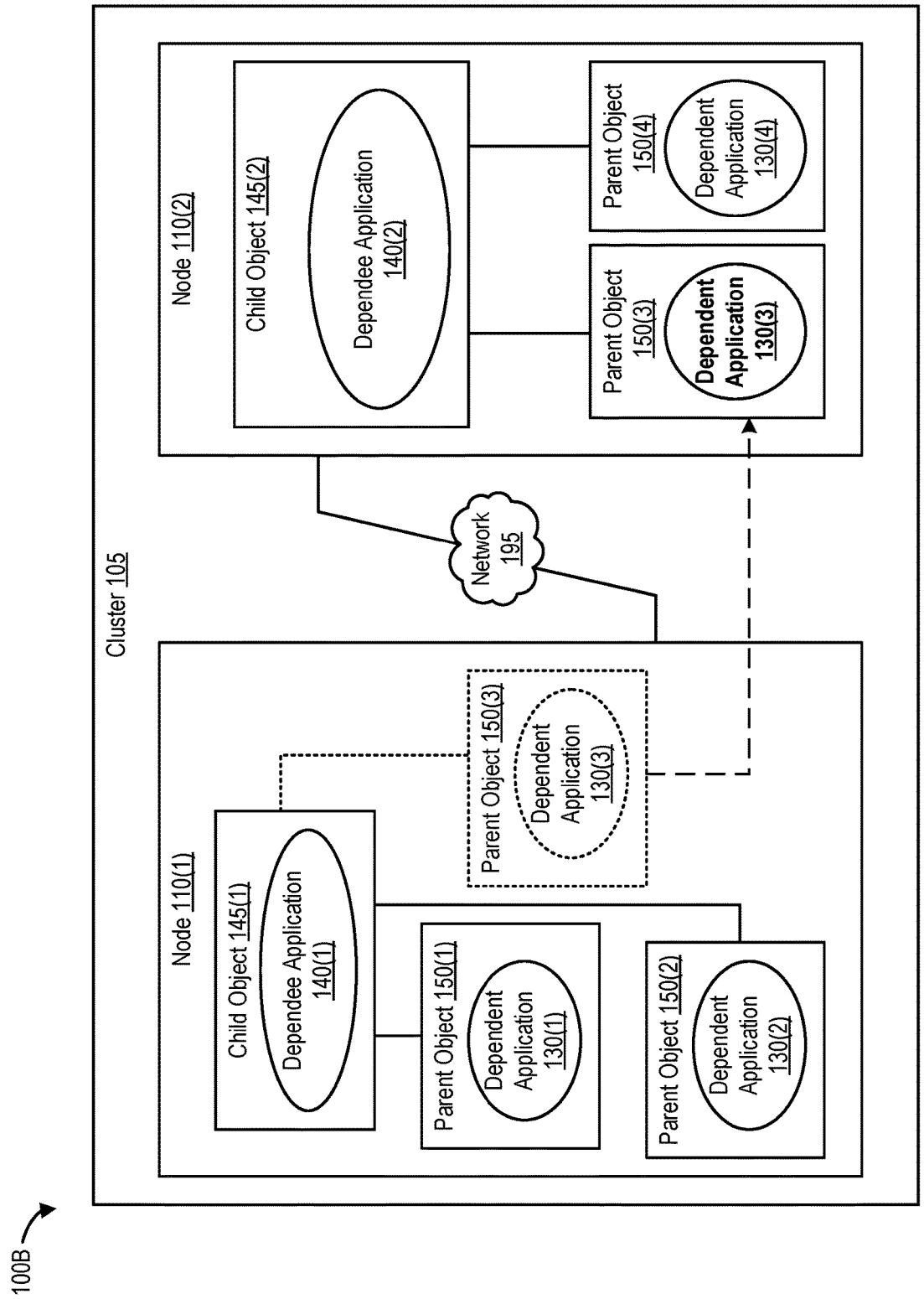
FIG. 1B is a block diagram 100B of various portions of a multitenant application, according to one embodiment of the present disclosure.

FIG. 1B is a block diagram 100B of portions of a multitenant application, according to one embodiment. In node 110(1), a child object 145(1) is a representation of dependee application 140(1), and parent objects 150(1), 150(2) and 150(3) are representations of dependee applications 130(1), 130(2), and 130(3), respectively. In node 110(2), a child object 145(2) represents dependee application 140(2), and a parent object 150(4) represents dependent application 130(4). Parent object 150(3) can be migrated from node 110(1) to node 110(2). Such a migration provides flexible associativity between dependent applications to choose a dependee applications, and, in one embodiment, can be performed by associativity manager 115(1) by modifying and/or updating a configuration file (e.g., configuration file 120(1)).

As previously noted, existing constructs are rigid in nature and do not permit flexible associativity of dependent applications. For example, existing constructs only permits the association of one parent object and one child object (e.g., <parent obj> with <child obj>) with a locality that is local or global, and a rigidity that is hard, firm, or soft. In one embodiment, configuration file 120(1) can be updated and/or modified by associativity manager 115(1) to associate a parent object with multiple child objects (e.g., <parent obj> with <child_obj1>, <child_obj2>, <child_obj3>, and so on) as well as include multiple locality and rigidity (e.g., <locality> and <rigidity>) options.

Locality refers to the preference given to a child object: (1) with regard to the node on which the child object is executed, and (2) with respect to the node on which the parent object is (or can be) executed. For example, a local locality gives preference to a child object (e.g., a dependee application) that is active on a local node, and a global locality gives preference to a child object's priority, irrespectively of whether the child object is active on a local node or elsewhere in the cluster (e.g., on some other node in cluster 105). Therefore, as will be appreciated, limiting locality to either local or global significantly limits the flexible associativity of dependent applications in multitenant clustered environments.

Rigidity refers to the dependency between a parent object (e.g., a dependent application) and child objects (e.g., dependee applications) in cluster 105. For example, hard rigidity requires a child object to be online in order to start a parent object. If a child object goes down, the corresponding parent object also goes down. If a currently associated child object cannot be brought online, the corresponding parent object also cannot go online by changing the parent object's associativity (e.g., the parent object can change associativity only if both the current associated child object as well as the target child object are online). Firm rigidity requires a parent object to failover (e.g., to another node in cluster 105) if a currently associated child object goes down (e.g., becomes faulted). If the currently associated child object cannot be brought online (e.g., started/booted successfully), the parent object can go online by changing associativity (e.g., to some other child object). Soft rigidity permits a parent object to continue to operate even if an associated child object becomes faulted and goes offline.

Therefore, as will be appreciated, a construct (e.g., a runtime construct) that does not limit locality and rigidity, and permits a parent object to associate with multiple child objects as part of a single universal construct is useful. FIG. 1C is a block diagram 100C of a configuration file that stores dependency and association information for a dependent application as part of a runtime construct, according to one embodiment. As shown in FIG. 1C, node 110(1) includes associativity manager 115(1). Associativity manager 115(1) updates and/or modifies configuration file 120(1) to store dependency information 155(1), last known association information 170(1), as well as new association information 175(1) at runtime. Dependency information 155(1) includes rigidity information 160(1) and locality information 165(1). In this example, node 110(1) executes parent object 150(1) that represents a pluggable application 180(1) (e.g., the dependent application).

Similarly, FIG. 1D is a block diagram 100D of another configuration file that stores dependency and association information for a dependee application as part of a runtime construct, according to one embodiment. As shown in FIG. 1D, node 110(2) includes associativity manager 115(2). Associativity manager 115(2) updates and/or modifies configuration file 120(2) (e.g., a copy of configuration file 120(1)) to store dependency information 155(2), last known association information 170(2), as well as new association information 175(2) at runtime. Dependency information 155(2) includes rigidity information 160(2) and locality information 165(2). In this example, node 110(2) executes child object 145(1) that represents a container application 185(1) (e.g., the dependee application).

Figure 1F:
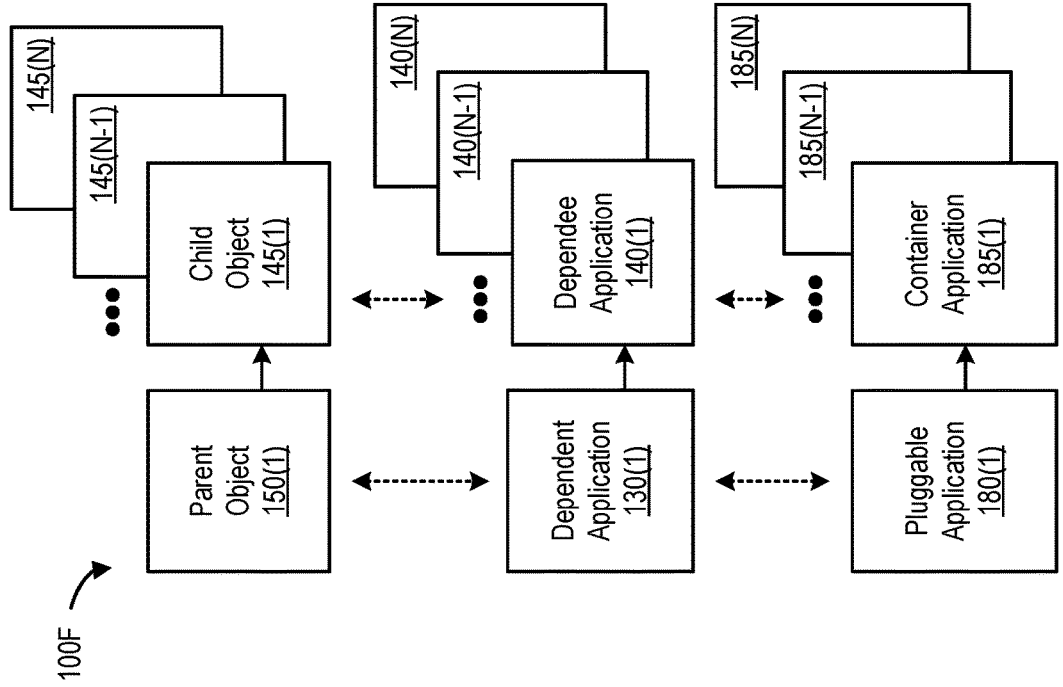
FIG. 1F is a block diagram 100F of the relationship between objects and applications in a clustered environment, according to one embodiment of the present disclosure.
Figure 1E:
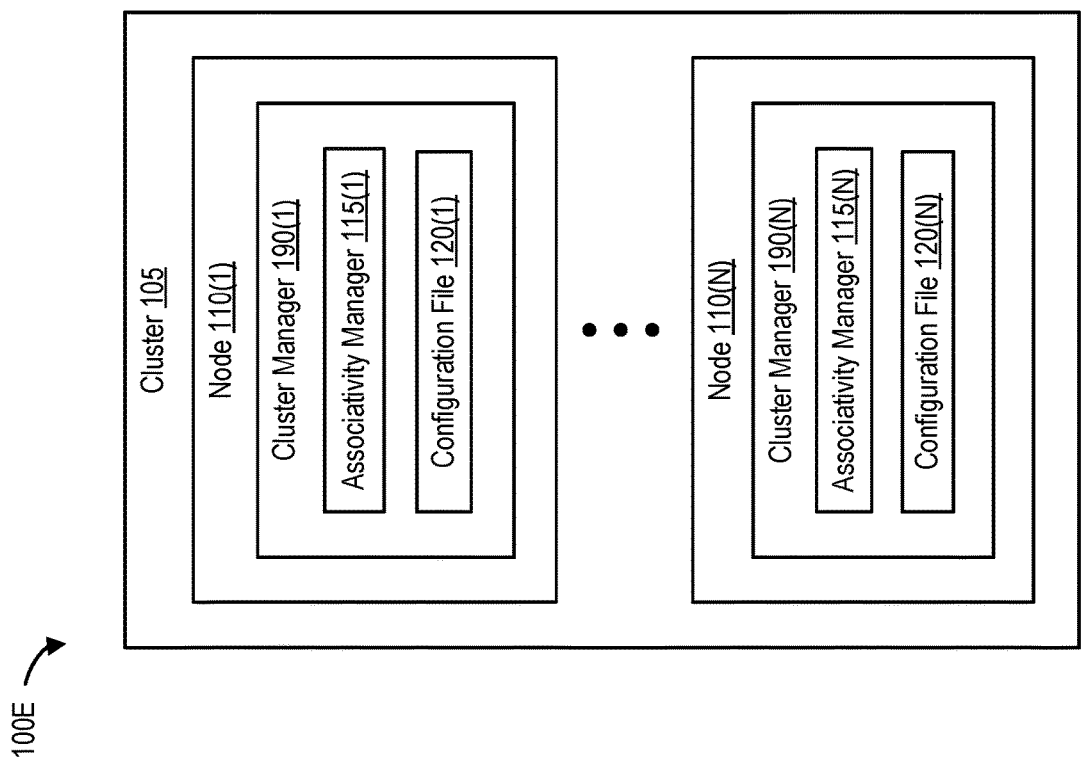
FIG. 1E is a block diagram 100E of a cluster that implements a cluster manager in nodes, according to one embodiment of the present disclosure.

FIG. 1E is a block diagram 100E of a cluster that implements a cluster manager in nodes, according to one embodiment. Node 110(1) implements cluster manager 190(1) (e.g., a cluster management application). In this example, cluster manager 190(1) implements associativity manager 115(1) and stores configuration file 120(1). Similarly, cluster manager 190(N) in node 110(N) implements associativity manager 115(N) and stores configuration file 120(N). It is noted that associativity managers 115(1) and 115(N) can execute independently of cluster managers 190(1) and 190(2), and configuration files 120(1)-(N) can be stored as a single configuration file outside of nodes 110(1)-(N) (e.g., in a master/cluster server).

Example Universal Constructs for Multitenant Clustered Environments

FIG. 1F is a block diagram 100F of the relationship between objects and applications in a clustered environment, according to one embodiment. As shown in FIG. 1F, parent object 150(1) represents dependent application 130(1). In this example, dependent application 130(1) can be pluggable application 180(1), or any pluggable portion of a multitenant application. Similarly, child objects 145(1)-(N) represent dependee applications 140(1)-(N). In this example, dependee applications 140(1)-(N) can be container applications 185(1)-(N), or any container portions of the multitenant application.

In one embodiment, cluster manager 190(1) and/or associativity manager 115(1) can at least: (1) modify configuration file 120(1) to permit a parent object to associate with multiple child objects based on multiple localities and rigidities, and (2) store current association information (also called last known association information). For example, <parent obj> can associate with <child_obj1>, <child_obj2>, <child_obj3>, . . . <locality> <rigidity>, and have a current association stored as last known association information (e.g., <parent_obj> with <child_obj1>).

Figure 2A:
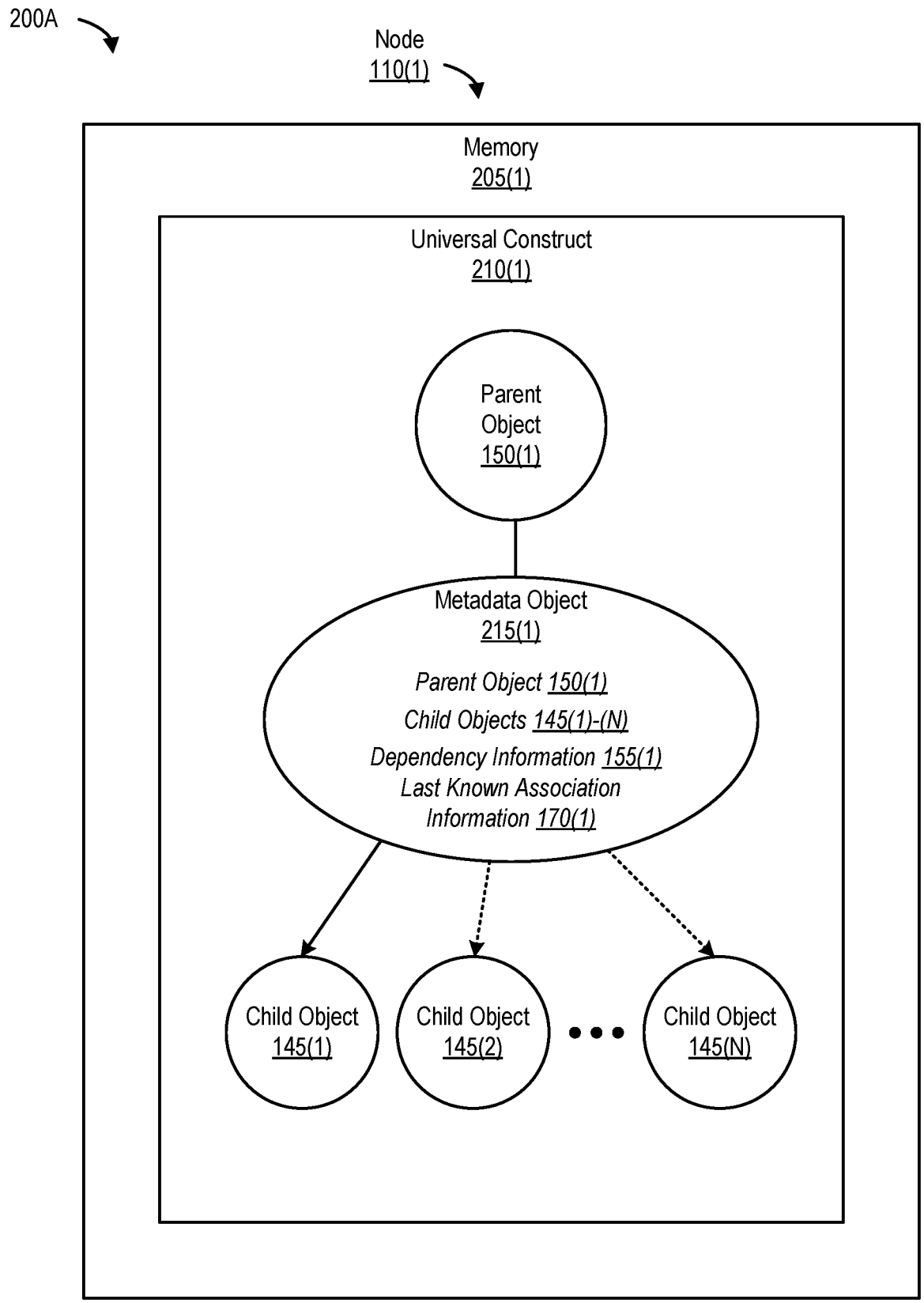
FIG. 2A is a block diagram 200A of a construct that provides flexible associativity of dependent applications, according to one embodiment of the present disclosure.

FIG. 2A is a block diagram 200A of a construct that provides flexible associativity of dependent applications, according to one embodiment. As shown in FIG. 2A, node objects (e.g., parent object 150(1) and child objects 145(1)-(N)) and arc objects (e.g., metadata object 215(1)) can be used to represent a cluster dependency. In this example, parent and child resource groups and/or service groups are represented using node objects (e.g., parent object 150(1) and child objects 145(1)-(N)). An arc object includes at least two node objects (e.g., parent object 150(1) and child objects 145(1)-(N)), and characteristics of a dependency (e.g., online-local-soft, online-global-firm, and the like, specified in dependency information 155(1) and last known information 170(1) as shown in metadata object 215(1)). In one embodiment, metadata object 215(1) links parent object 150(1) with multiple child objects (e.g., child objects 145 (1)-(N)), and includes characteristics of the association (e.g., locality, rigidity, current/last known association information, and the like).

In this manner, cluster manager 190(1) and/or associativity manager 115(1) can generate a universal construct 210(1) that executes in memory 205(1) of node 110(1) (or in the memory of a master/cluster server) and permits flexible associativity of dependent applications in clustered environments. For example, cluster manager 190(1) and/or associativity manager 115(1) can produce an updated configuration file (e.g., configuration file 120(1)) by generating new relationship information (e.g., new association information 175 (1) as shown in FIG. 1C) based on one or more associations between a parent object (e.g., parent object 150(1)) and one or more child objects (e.g., child objects 145(1)-(5)), and storing the new relationship information in a metadata object (e.g., metadata object 215(1) as shown in FIG. 2A).

In one embodiment, cluster manager 190(1) and/or associativity manager 115(1) also accesses (and maintains) current relationship information (e.g., last known association information 170(1)), and stores the current relationship information in the metadata object. It will be appreciated that the last known association information can be based on an association between a parent object and a child object other than one or more child objects used to generate the new relationship information (e.g., child object 145(6)).

In some embodiments, cluster manager 190(1) and/or associativity manager 115(1) accesses configuration file 120(1). In this example, configuration file 120(1) is associated at least one dependent application (e.g., a pluggable application) and multiple dependee applications (e.g., container applications) that execute in a cluster (e.g., cluster 105). Configuration file 120(1) includes a metadata object (e.g., metadata object 215(1)). The metadata object indicates an association between the parent object and the child object, and includes dependency information. It will be appreciated that updating and/or modifying a configuration file in this manner permits a parent object that represents a dependent application to be started (or onlined) based on the updated configuration file, particularly where such updating and/or modification is performed at runtime. In addition to supporting starting a parent object in clustered environments, cluster manager 190(1) and/or associativity manager 115(1) also store last known association information, and permit fault recovery of both parent objects and child objects in such multitenant clustered environments.

As previously noted, cluster manager 190(1) and/or associativity manager 115(1) saves and stores current association/last known association information (e.g., last known association information 170(1)). It is important to save this current association/last known association information because cluster manager 190(1) requires the status quo of the dependency between a given parent object and child objects. For example, if a parent object requires or favors (e.g., based on locality information and/or rigidity information) the last associated child object, having access to such saved and/or stored current association/last known association information when restarting on failure or restart can be useful to quickly and efficiently start (or online) the parent object. In one embodiment, the current association/last known association information can be saved and/or stored in a configuration file (e.g., main.cf) and/or a cookie file. In another embodiment, the current association/last known association information can be saved and/or stored in a persistent database.

FIG. 2B is a table 200B of configuration files 120(1)-(N) at a given point in time (e.g., at a time T, such as runtime), according to one embodiment. In some examples, configuration files 120(1)-(N) can include a node field 220, a parent object field 225, a child object(s) field 230, a current association field 235, a new association field 240, a dependency field 245, and an action field 250. In one embodiment, parent object 150(1) can associate with child objects 145 (1)-(4) and does not have a current association. Because the preferred locality is local, parent object 150(1) associates with child object 145(1) because child object 145(1) is local to parent object 150(1) (e.g., both parent object 150(1) and child object 145(1) execute on node 110(1)). In another embodiment, parent object 150(1) can associate with child objects 145(1)-(4), but is currently associated with child object 145(1). If child object 145(1) faults and goes offline for any reason, parent object 150(1) associates with child object 145(2) on node 110(1) because the dependency requires a local locality. In yet another embodiment, parent object 150(1) can associate with child objects 145(1)-(4), but is currently associated with child object 145(1). If child object 145(1) faults and goes offline for any reason, parent object 150(1) can associate with child object 145(3) because the dependency permits a global locality, and child object 145(3) has priority. Therefore, in this manner, configuration files 120(1)-(N) can be updated across cluster 105 to permit flexible associativity of parent objects.

Examples of Onlining a Parent Object and Updating Association

In one embodiment, an example to online a given parent object (e.g., parent object 150(1)) can include at least the following procedure:

If Current Association=NULL then

{

// It's a clean slate.

For each child_obj in associativity list (e.g., in configuration file)

If child_obj is ONLINE then

// Child_obj found for associating

Mark child object as "Current Association", assoc_child_obj

Update the data structure (e.g., metadata object) and dump updated main.cf

Attempt onlining parent_obj where assoc_child_obj is ONLINE

Return TRUE

End If

End For

If child_obj not found for associating then

// Exit the online procedure without onlining parent_obj

Retry after any child_obj goes ONLINE

Return FALSE

End If

} Else {

// Parent_obj is currently associated with a child_obj (e.g., assoc_child_obj)

```
If assoc_child_obj=ONLINE then
    Attempt onlining parent_obj where assoc_child_obj is
ONLINE
    Return TRUE
Else
    // assoc_child_obj not ONLINE
If Rigidity=Hard then
    // Associativity cannot be changed
    Retry after assoc_child_obj goes ONLINE
    Return FALSE
Else
    // Rigidity=Firm OR Rigidity=Soft
If assoc_child_obj=OFFLINE then
    // Exit the online procedure without onlining parent_obj
    Retry after assoc_child_obj goes ONLINE
    Return FALSE
Else if assoc_child_obj=FAULTED then
    // Give up on assoc_child_obj, update Current Association
    Invoke updateAssociation procedure to update Current
Association
If updateAssociation=TRUE then
    Attempt onlining parent_obj where assoc_child_obj is
ONLINE
    Return TRUE
Else
    Return FALSE
    End If
    End If
    End If
    End If
    End If
In another embodiment, an example to update association
between a parent object and child objects can include at least
the following procedure: If (Rigidity==Hard) AND (Paren-
t_obj !=ONLINE) OR (assoc_child_obj !=ONLINE) then
    // For Hard, associativity can be changed only if
    // Parent_obj, current (e.g., assoc_child_obj) and target
        child_objs are online
    Return FALSE
End If
If (Locality=Local) then
    For each child_obj in associativity list (e.g., in configu-
ration file)
    If child_obj is ONLINE AND is on same system as
parent_obj then
        // Child_obj found for associating
        Mark child_obj as "Current Association", assoc_chi-
ld_obj
    Update data structure (e.g., metadata object) and dump
configuration information
    Return TRUE
End If
End For
End If
For each child_obj in associativity list
If child_obj is ONLINE then
    // Child_obj found for associating
    Mark child_obj as "Current Association", assoc_chi-
ld_obj
    Update the data structure and dump updated configuration
information
    Return TRUE
End If
End For
    // Child_obj not found for associating then
Return FALSE
```

Examples of Fault Recovery in Multitenant Clustered Environments

Figure 3A:
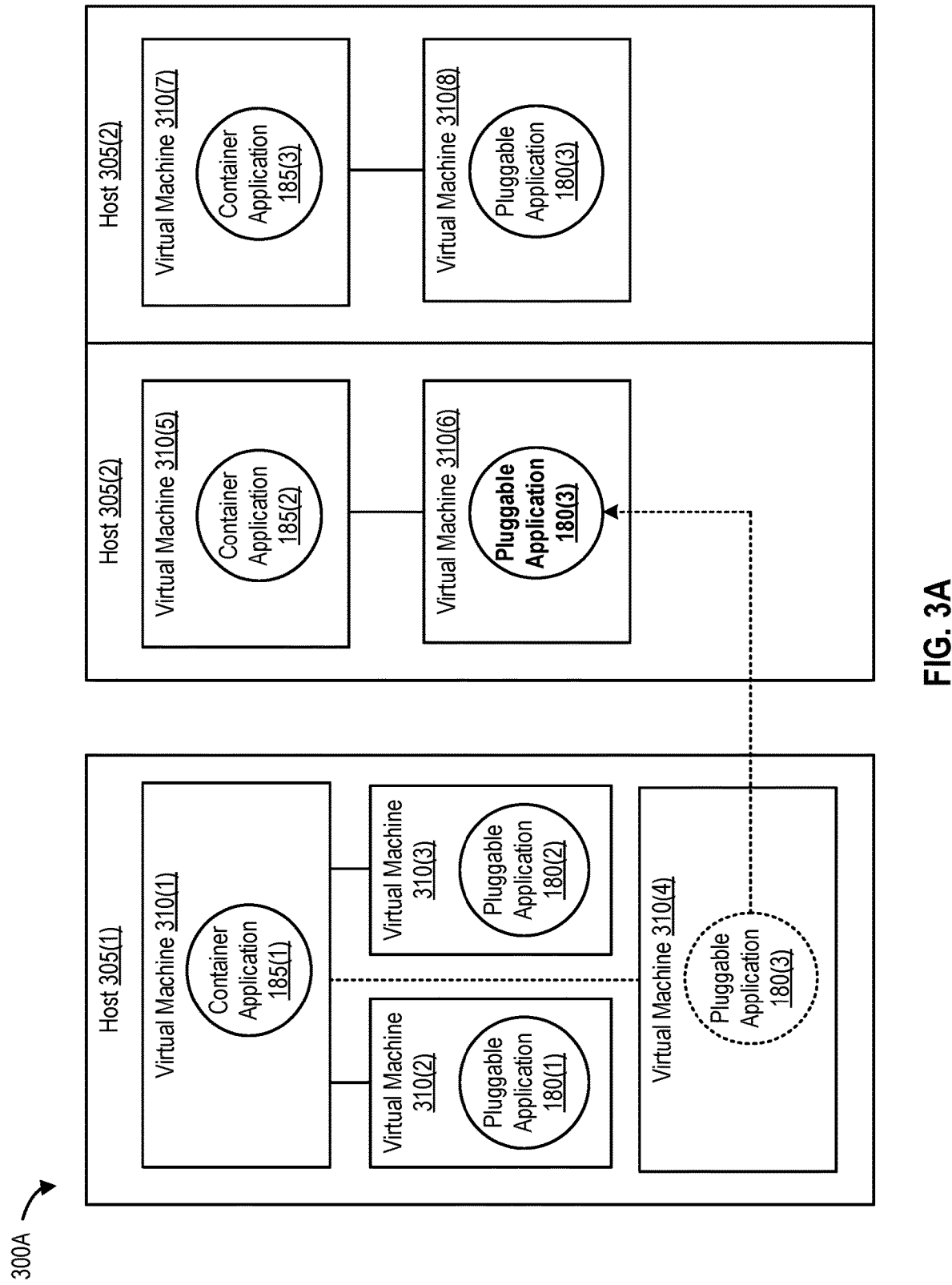
FIG. 3A is a block diagram 300A of a multitenant application implemented by virtual machines across multiple hosts, according to one embodiment of the present disclosure.

FIG. 3A is a block diagram 300A of a multitenant application implemented by virtual machines across multiple hosts, according to one embodiment. As shown in FIG. 3A, hosts 305(1) and 305(2) are nodes operating in a cluster. Host 305(1) implements virtual machines 310(1)-(4). Virtual machine 310(1) serves as a parent object and executes container application 185(1) (e.g., a dependee application). Virtual machines 310(2)-(4) serve as child objects and execute pluggable applications 180(1)-(3) (e.g., dependent applications). If virtual machine 310(4) faults and goes offline for any reason, universal construct 210(1), which can be generated by cluster manager 190(1), migrates (or moves) pluggable application 180(3) (e.g., a production database) from virtual machine 310(4) executing on host 305(1) to virtual machine 310(6) executing on host 305(2). In another embodiment, virtual machine 310(4) (e.g., with pluggable application 180(3)) can itself be migrated or moved from host 305(1) to 305(2). In this manner, a parent object (e.g., a dependent application) can be started in clustered environments by migrating the parent object to another node/host.

In one embodiment, an example to perform parent object fault recovery (e.g., if a parent object has faulted) can include at least the following procedure:

```
If parent_obj can be restarted on the same system/host/
node then
    // No need to change associativity
    Attempt onlining parent_obj on same system
    Return TRUE
Else
    // Need to failover on different system
    If Locality=Global then
        // No need to change associativity
        // Parent_obj can be onlined on target system and assoc-
            _child_obj can
        // continue on previous system
        Attempt onlining parent_obj on target system
        Return TRUE
    Else
        // Need to find a local assoc_child_obj on target system
        Invoke updateAssociation procedure to update Current
            Association If updateAssociation=TRUE then
        Attempt onlining parent_obj where assoc_child_obj is
            ONLINE
        Return TRUE
    Else
    Return FALSE
    End If
    End If
    End If
```

In one embodiment, an example to perform child object fault recovery (e.g., if a child object has faulted) can include at least the following procedure:

```
If child_obj can be restarted on same system then
    // No need to change associativity
    Restart parent_obj on same system
    Return TRUE
Else
    // Child_obj needs to fail over to different system
    Stop parent_obj
    Invoke parent_obj fault recovery procedure for paren-
        t_obj
End If
For offlining parent_obj and child_obj,
Parent_obj can be offlined irrespective of child_obj state.
Child_obj can be offlined only if child_obj's associated
    parent_obj is offline.
```

Figure 3B:
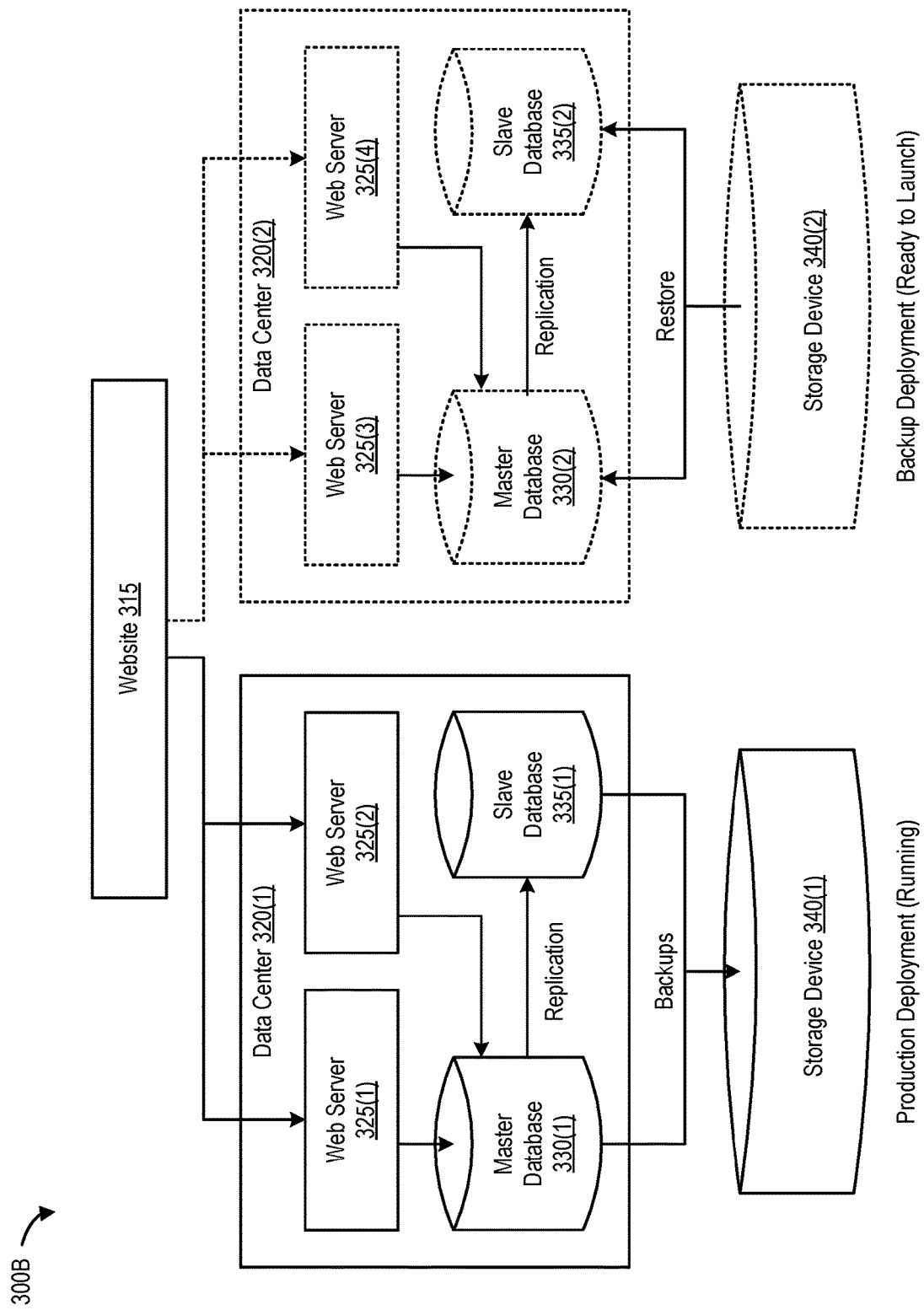
FIG. 3B is a block diagram 300B of a computing system configured for failover, according to one embodiment of the present disclosure.

FIG. 3B is a block diagram 300B of a computing system configured for failover, according to one embodiment. As shown in FIG. 3B, website 315 is served by data center 320(1). Data center 320(1) includes a web servers 325(1) and 325(2). In one embodiment, web server 325(1) stores data in master database 330(1). This data is then replicated from master database 330(1) to slave database 335(1). Both master database 330(1) and slave database 335(1) backup this data to storage device 340(1), which is a (running) production deployment. On the other hand, storage device 340(2) is a backup deployment that is ready to launch if data center 320(1) experiences a failure that affects the provisioning of data to website 315. Data center 320(2) includes web servers 325(3) and 325(4). Master database 330(2) replicates data to slave database 335(2), and data can be restored to both master database 330(2) and slave database 335(2) from storage device 340(2). It will be appreciated that in such computing environments that are configured for failover, providing flexible associativity for dependent applications can permit efficient fault recovery of both parent objects and child objects.

Examples of Updating a Configuration File and Saving Current Association

In one example, cluster 105 can include nodes 110(1)-(4) (e.g., a four node cluster). A Parent object (e.g., an object-level representation of a dependent application) can be attached to (and associated with) multiple child objects (e.g., object-level representations of dependee applications).

In one embodiment, parent_obj1 (e.g., a pluggable portion of a multitenant application) can associate with child_obj1, child_obj2, child_obj3, and child_obj4 (e.g., container portions of the multitenant application) with local locality, firm rigidity, and no current association. This example scenario can occur during startup time. Parent_obj1 is open for association with any child_obj (1-4). In this example, cluster manager's target selection logic selects a system (e.g., a node or a host) with a child_object that is online. Node 110(2) is selected as the target system for onlining, and child_obj3 is active on node 110(2). Therefore, in this example scenario, parent_obj1 will associate itself with child_obj3. The updated configuration file will include: <parent_obj1 can associate with child_obj1, child_obj2, child_obj3, child_obj4, local firm>, and the last known association information will include: <Current Association: parent_obj1 with child_obj3>.

In another embodiment, parent_obj1 can associate with child_obj1, child_obj2, child_obj3, and child_obj4 with global locality, firm rigidity, and a current association of parent_obj1 with child_obj3. In this example scenario, it should be noted that the configuration (e.g., a configuration file) has been auto-updated based on the last association. This example scenario can occur during startup or runtime. Because parent_obj1 can be started only if child_obj3 is online, parent_obj1 is unaffected by the state of child_obj1, child_obj2, and child_obj4. If child_obj3 also fails or becomes faulted for any reason, parent_obj1 will try to failover. Because the current/last known association is local, another locally operating child_obj will be preferred. Node 110(2) has child_obj3 and child_obj4 online. Child_obj3's failure will trigger the failover of parent_obj1. For example, parent_obj1 will restart on node 110(2), detach itself from child_obj3, and attach itself to child_obj4. In this example, the updated configuration file will include: <parent_obj1 can associate with child_obj1, child_obj2, child_obj3, child_obj4, local firm>, and the last known association information will include: <Current Association: parent_obj1 with child_obj4>.

In some embodiments, parent_obj1 can associate with child_obj1, child_obj2, child_obj3, and child_obj4 with global locality, firm rigidity, and a current association of parent_obj1 with child_obj2. In this example scenario, parent_obj1 can be started, booted up, and/or onlined only if child_obj2 is online. Therefore, parent_obj1 is unaffected by the states of child_obj1, child_obj3, and child_obj4. If child_obj2 fails or becomes faulted for any reason, parent_obj1 will try to failover. Because the association is global, child objects will be preferred in the order of child_obj1-child_obj2-child_obj3-child_obj4. These child objects can be active anywhere in the cluster. In this example, child_obj2 and child_obj4 are online on node 110(2), and child_obj1 and child_obj3 are online on node 110(1). Child_obj2's failure will trigger failover of parent_obj1. In this example scenario, parent_obj1 will attach itself with child_obj1 and will failover to node 110(2). In this example, the updated configuration file will include: <parent_obj1 can associate with child_obj1, child_obj2, child_obj3, child_obj4, local firm>, and the last known association information will include: <Current Association: parent_obj1 with child_obj1>.

In other embodiments, parent_obj1 can associate with child_obj1, child_obj2, child_obj3, and child_obj4 with local or global locality, soft rigidity, and a current association of parent_obj1 with child_obj2. In this example, a soft rigidity constraint is a startup constraint. While going online, child_obj2 must be onlining for onlining parent_obj1. Once up, parent_obj1 can continue to operate even if child_obj2 faults or goes offline for any reason. However, on the next startup, onlining of parent_obj1 will block for child_obj2's online. If parent_obj1 faults, parent_obj1 will look for another child object. Child objects will be preferred based on locality (e.g., local or global).

Therefore, in at least this manner, configuration file(s) can be updated and last known association information can be saved to provide flexible associativity of dependent applications.

Figure 4A:
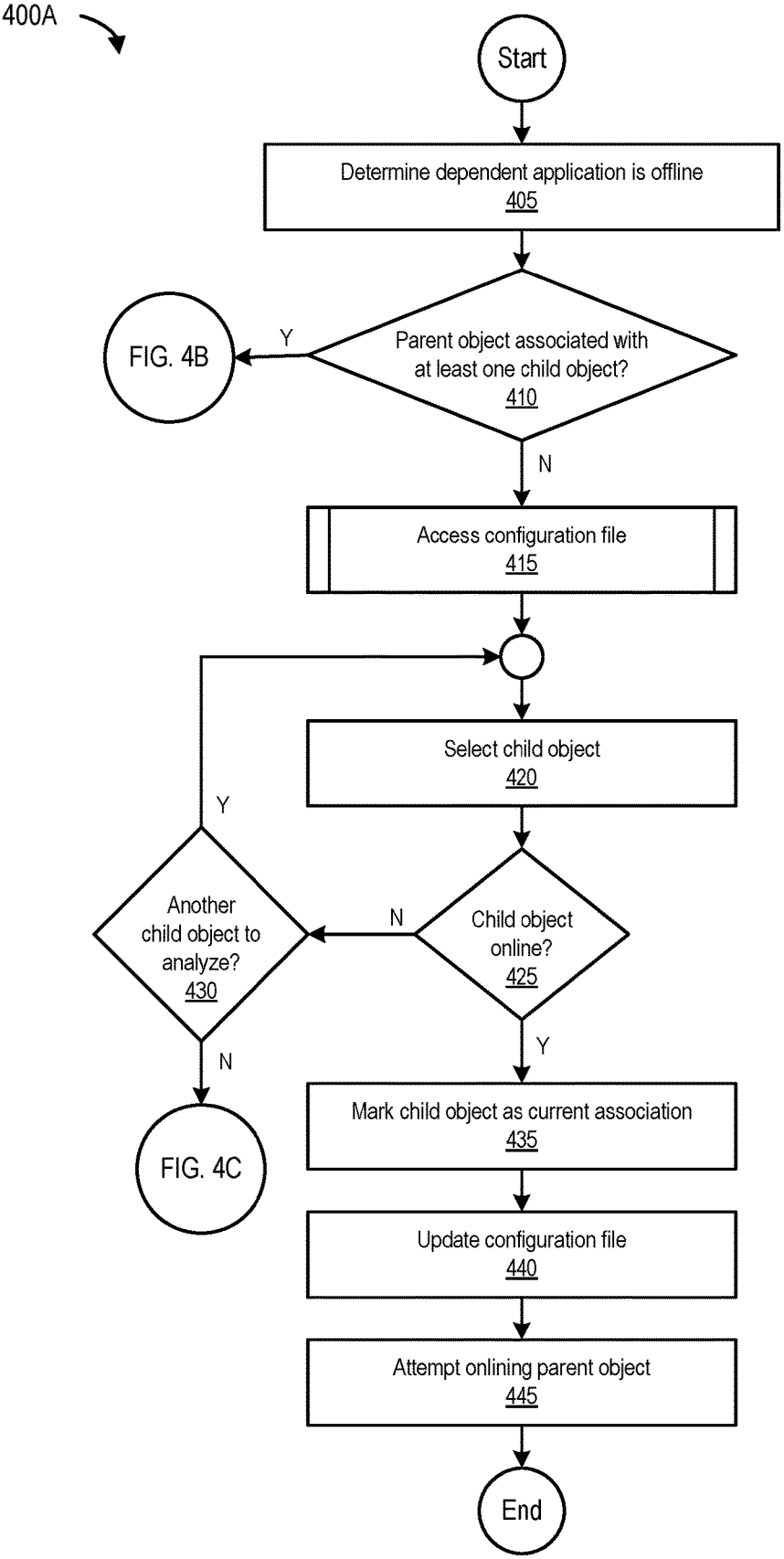
FIG. 4A is a flowchart 400A of a process for starting a dependent application, according to one embodiment of the present disclosure.

Example Processes for Flexible Associativity in Multitenant Clustered Environments FIG. 4A is a flowchart 400A of a process for starting a dependent application, according to one embodiment. The process begins at 405 by determining that a dependent application is offline. At 410, the process determines whether a parent object is associated with at least one child object. In this example, the parent object represents the dependent application. If the parent object is associated with at least one child object, the process loops to FIG. 4B. If the parent object is not associated with at least one child object, the process, at 415, access a configuration file (e.g., configuration file 120(1)).

At 420, the process selects a child object (e.g., from an associativity list that is part of the configuration file). At 425, the process determines whether the (selected) child object is online. If the selected child object is not online (e.g., on the same node as the parent object), the process, at 430, selects another child object from the associativity list to analyze. If there are no more child objects to analyze in the associativity list, the process loops to FIG. 4C. However, if the selected child object is online, the process, at 435, marks the child object as the current association. At 440, the process updates the configuration file, and ends at 445 by attempting to online the parent object.

Figure 4B:
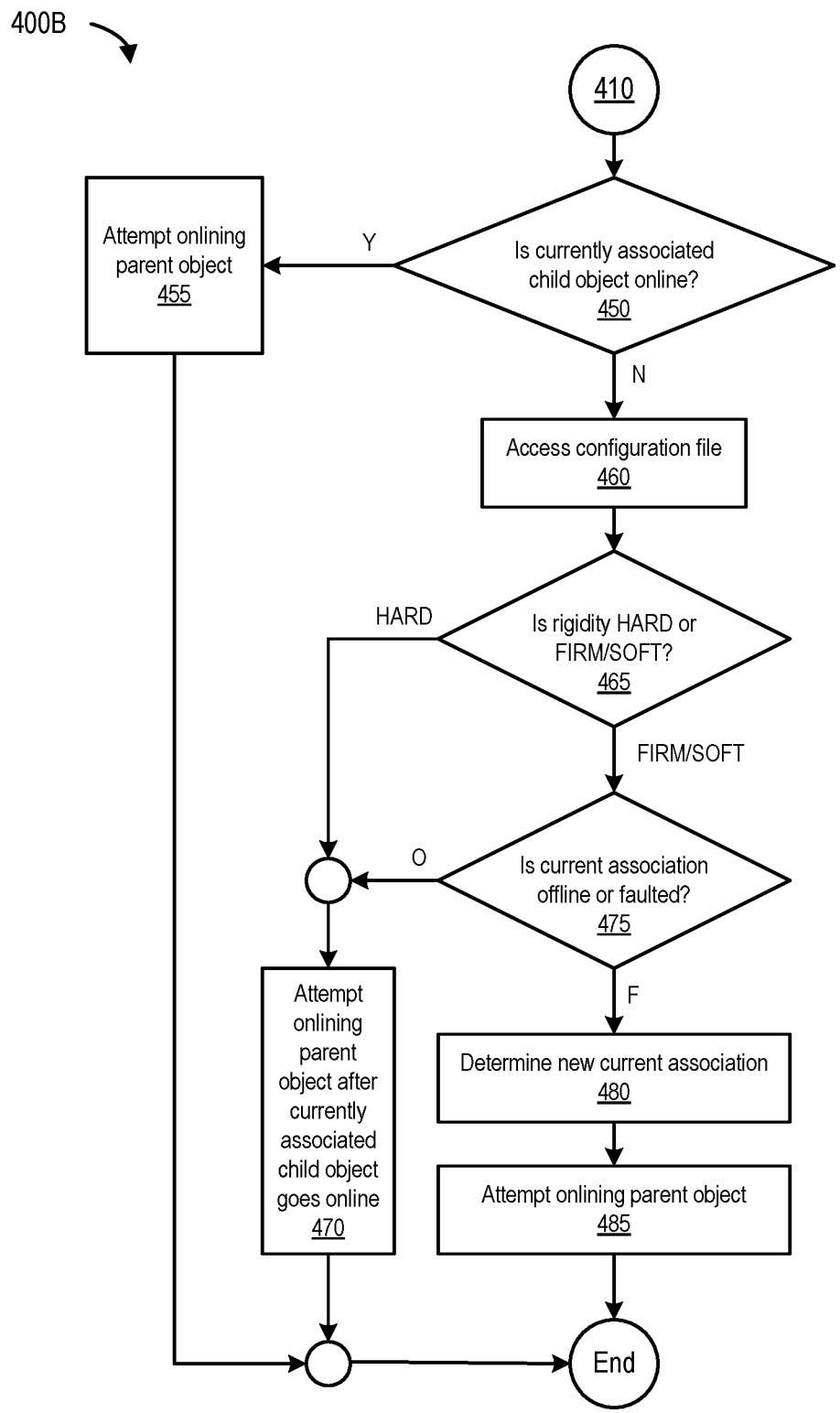
FIG. 4B is a flowchart 400B of another process for starting a dependent application, according to one embodiment of the present disclosure.

FIG. 4B is a flowchart 400B of another process for starting a dependent application, according to one embodiment. As previously noted, if a parent object is associated with at least one child object, the process of FIG. 4A loops to FIG. 4B and begins at 450 by determining if a currently associated child object (of the parent object) is online (e.g., on the same node or host). If the currently associated child object is online, the process ends at 455 by attempting to online the parent object. However, if the currently associated child object is not online, the process, at 460, accesses the configuration file.

At 465, the process determines whether the rigidity specified in the configuration file (e.g., in the metadata object as part of dependency information) is hard or firm/soft. If the specified rigidity is hard, the process ends at 470 by attempting to online the parent object after the current associated child object goes online. However, if the specified rigidity is firm or soft, the process proceeds to 475. At 475, the process determines whether the current association if offline or faulted. If the current association is offline, the process ends at 470 by attempting to online the parent object after the current associated child object goes online. However, if the current association is faulted, the process, at 480, determines a new current association and ends at 485 by attempting to online the parent object.

Figure 4C:
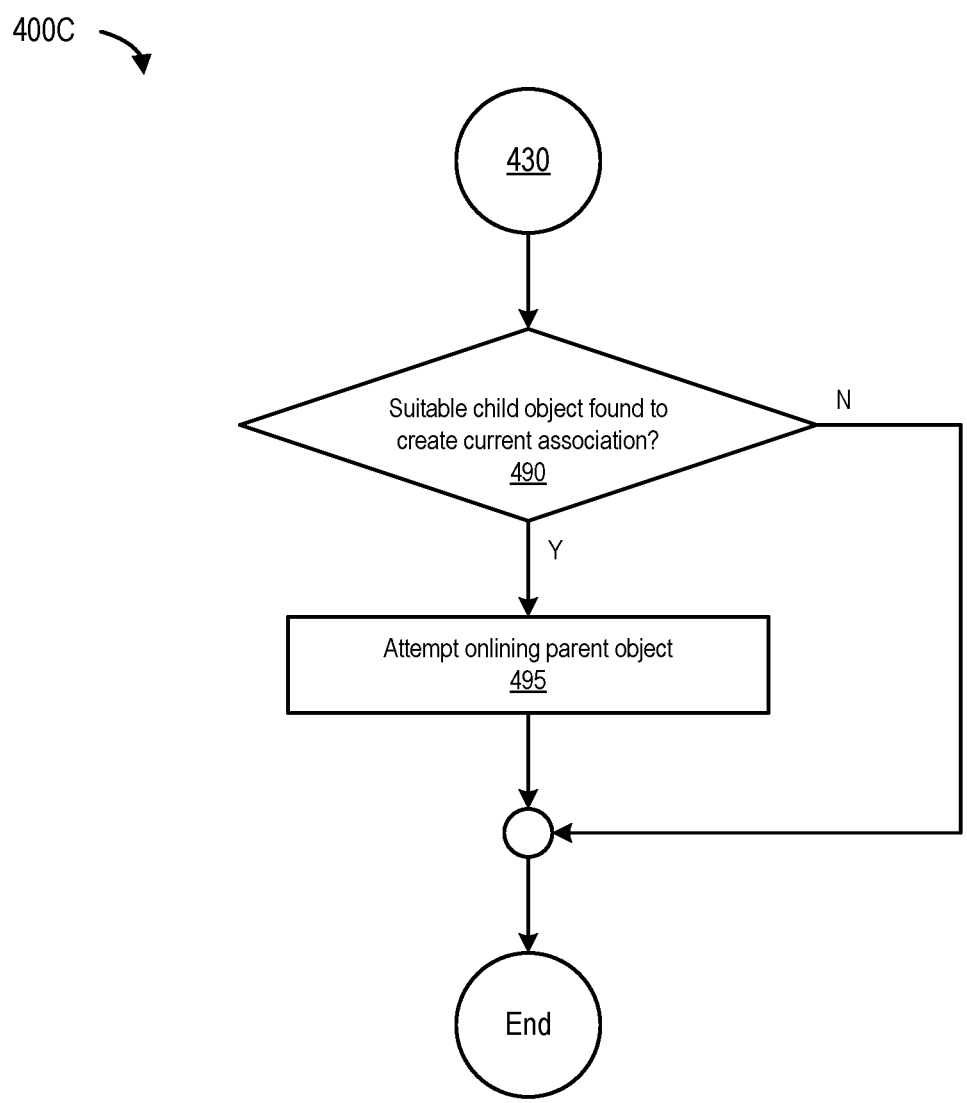
FIG. 4C is a flowchart 400C of a process for determining current associativity in a cluster, according to one embodiment of the present disclosure.

FIG. 4C is a flowchart 400C of a process for determining current associativity in a cluster, according to one embodiment. As previously noted, if there are no more child objects to analyze in the associativity list, the process of FIG. 4A loops to FIG. 4C and begins at 490 by determining if there is a suitable child object found to create a current association (e.g., based on a global locality instead of a local locality, and/or based on a soft or firm rigidity as opposed to a hard rigidity). If there is no suitable child object found to create the current association, the process ends. However, if there is a suitable child object found to create the current association, the process ends at 495 by attempting to online the parent object.

Figure 5A:
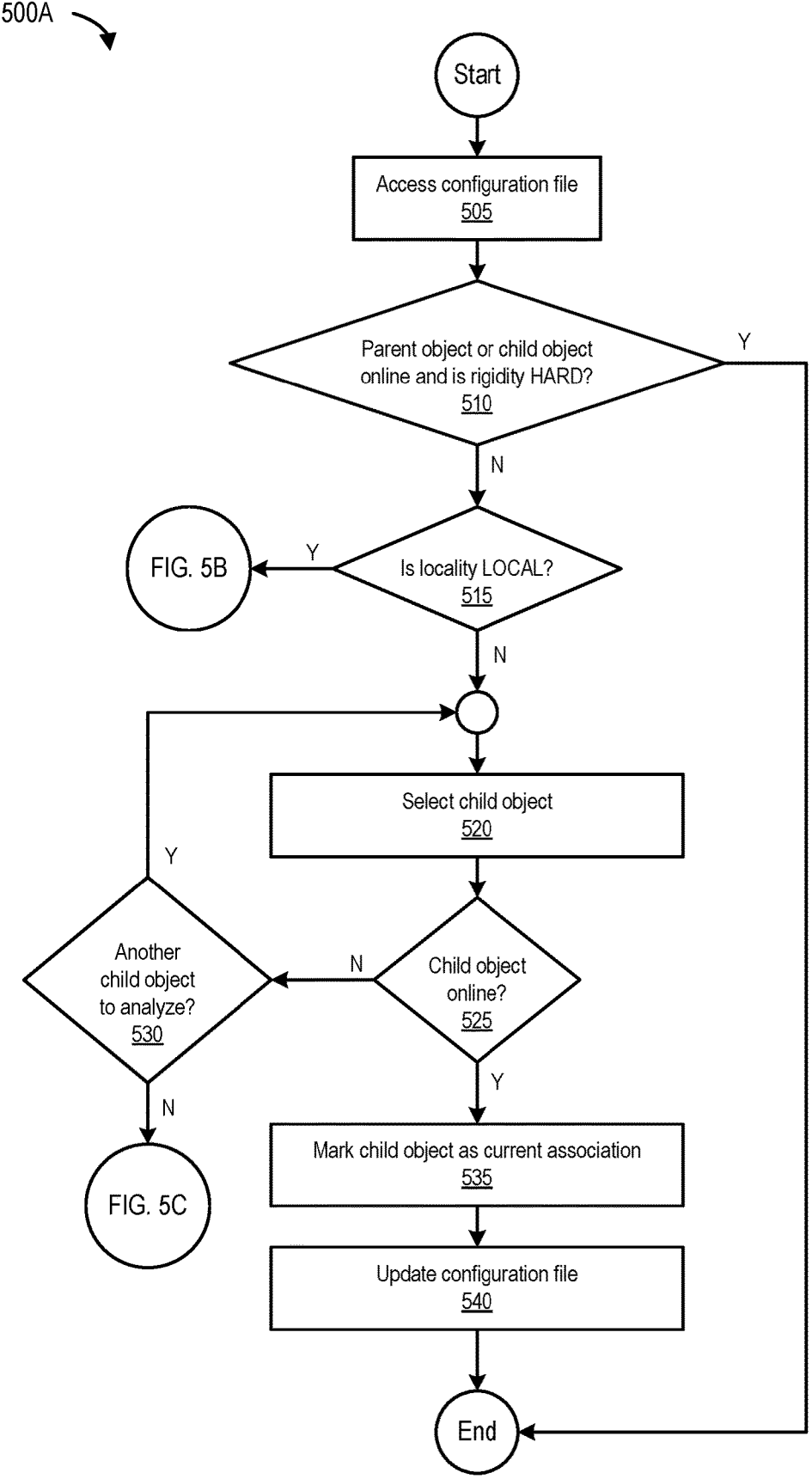
FIG. 5A is a flowchart 500A of a process for updating a configuration file, according to one embodiment of the present disclosure.

FIG. 5A is a flowchart 500A of a process for updating a configuration file, according to one embodiment. The process begins at 505 by accessing a configuration file (e.g., at runtime or startup). At 510, the process determines whether a parent object or an associated child object are both online and whether the rigidity is hard. If the parent object or associated child object are online and the rigidity is hard, the process ends. However, if the parent object or associated child object are not online and/or the rigidity is not hard, the process, at 515, determines if the locality is local. If the specified locality is local, the process loops to FIG. 5B. However, if the specified locality is not local, the process, at 520, selects a child object (e.g., from an associativity list associated with the configuration file). At 525, the process determines if the (selected) child object is online. If the child object is online, the process, at 530, determines if there is another child object (e.g., in the associativity list) to analyze. If there are no more child objects to analyze, the process loops to FIG. 5C. However, if a child object is online, the process, at 535, marks the child object as the current association and ends at 540 by updating the configuration file (and storing the current association as last known association information).

Figure 5B:
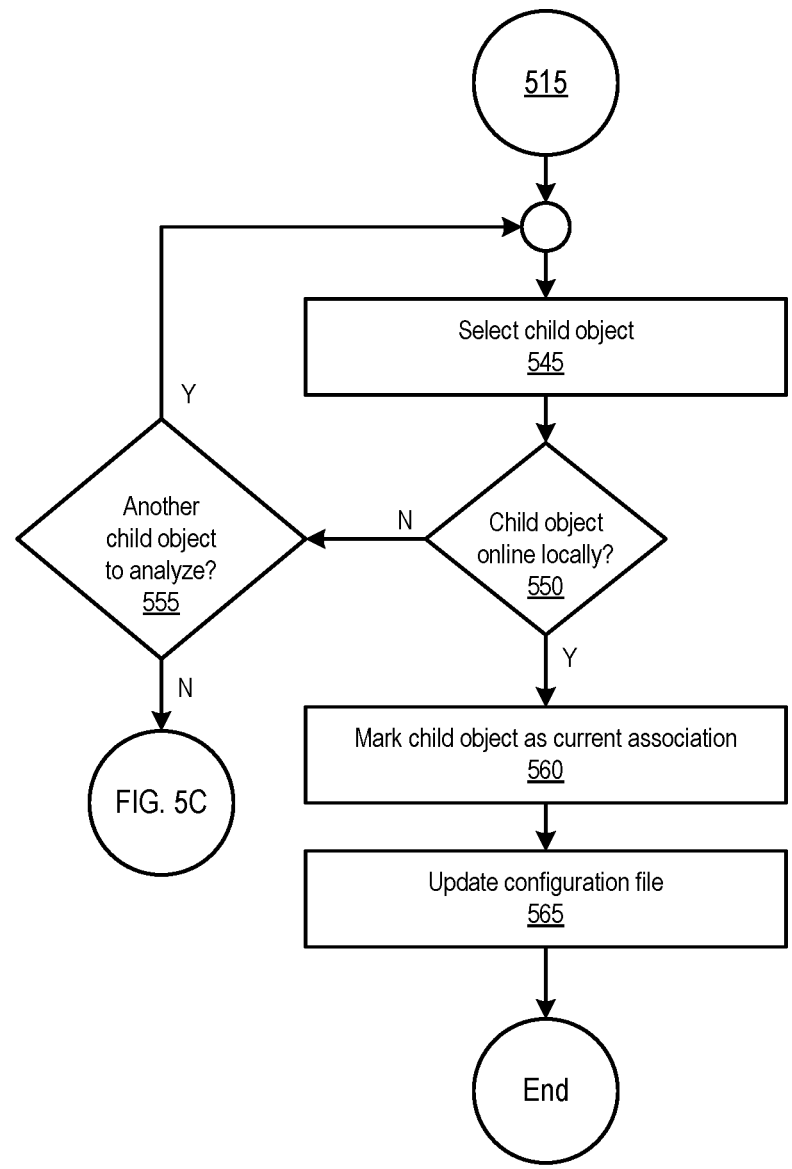
FIG. 5B is a flowchart 500B of another process for updating a configuration file, according to one embodiment of the present disclosure.

FIG. 5B is a flowchart 500B of another process for updating a configuration file, according to one embodiment. As previously noted, If the specified locality is local, the process of FIG. 5A loops to FIG. 5B and begins at 545 by selecting a child object. At 550, the process determines whether the child object is online locally (e.g., on the same node or host as the parent object). If the child object is not online locally, the process, at 555, determines whether there are other child objects to analyze (e.g., in the associativity list). If there are no more child objects to analyze, the process loops to FIG. 5C. However, if the child object is online locally, the process, at 560, marks the child object as the currently association and ends at 565 by updating the configuration file (and storing the current association as last known association information).

Figure 5C:
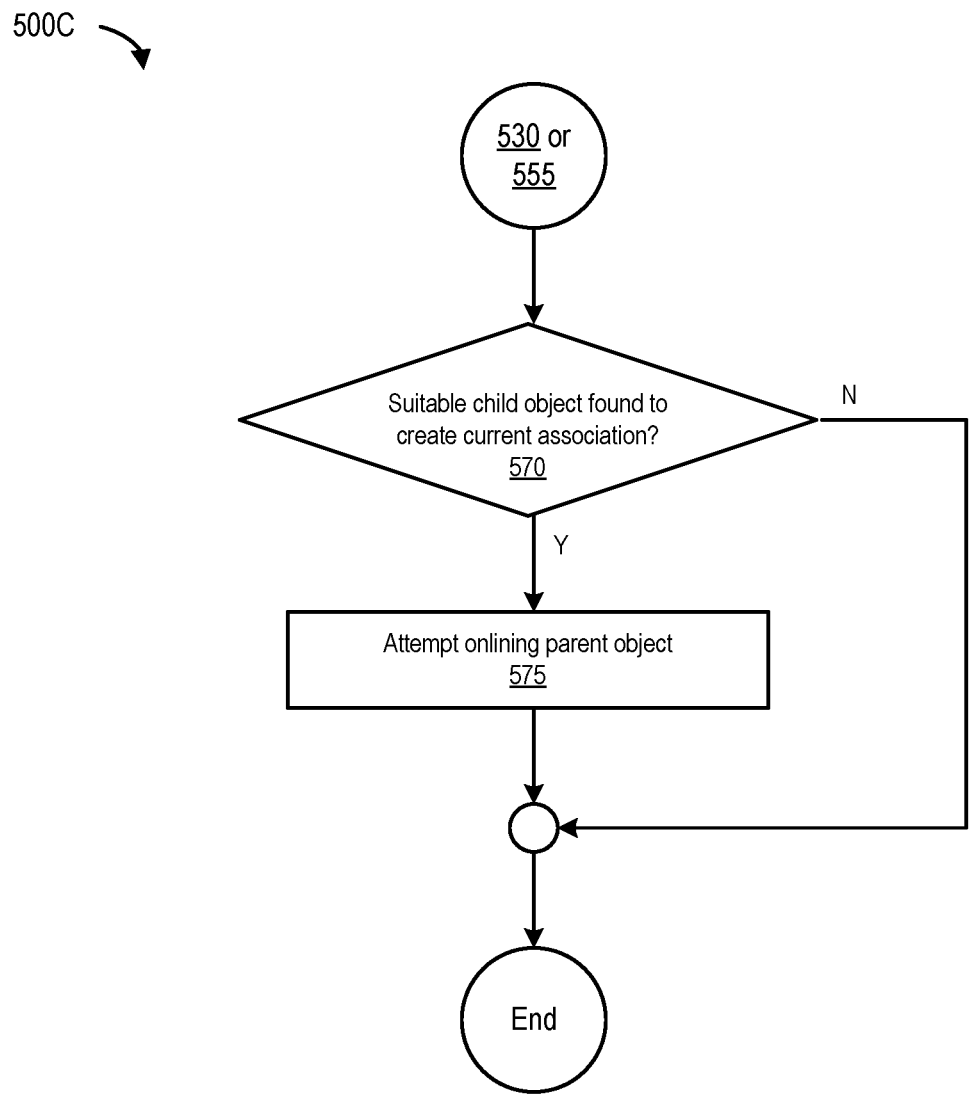
FIG. 5C is a flowchart 500C of another process for determining current associativity in a cluster, according to one embodiment of the present disclosure.

FIG. 5C is a flowchart 500C of another process for determining current associativity in a cluster, according to one embodiment. As previously noted, the processes of FIGS. 5A and 5B loop to FIG. 5C is there are no more child objects to analyze. The process of FIG. 5C begins at 570 by determining if there is a suitable child object found to create a current association (e.g., based on a global locality instead of a local locality, and/or based on a soft or firm rigidity as opposed to a hard rigidity). If there is no suitable child object found to create the current association, the process ends. However, if there is a suitable child object found to create the current association, the process ends at 575 by attempting to online the parent object.

Figure 6:
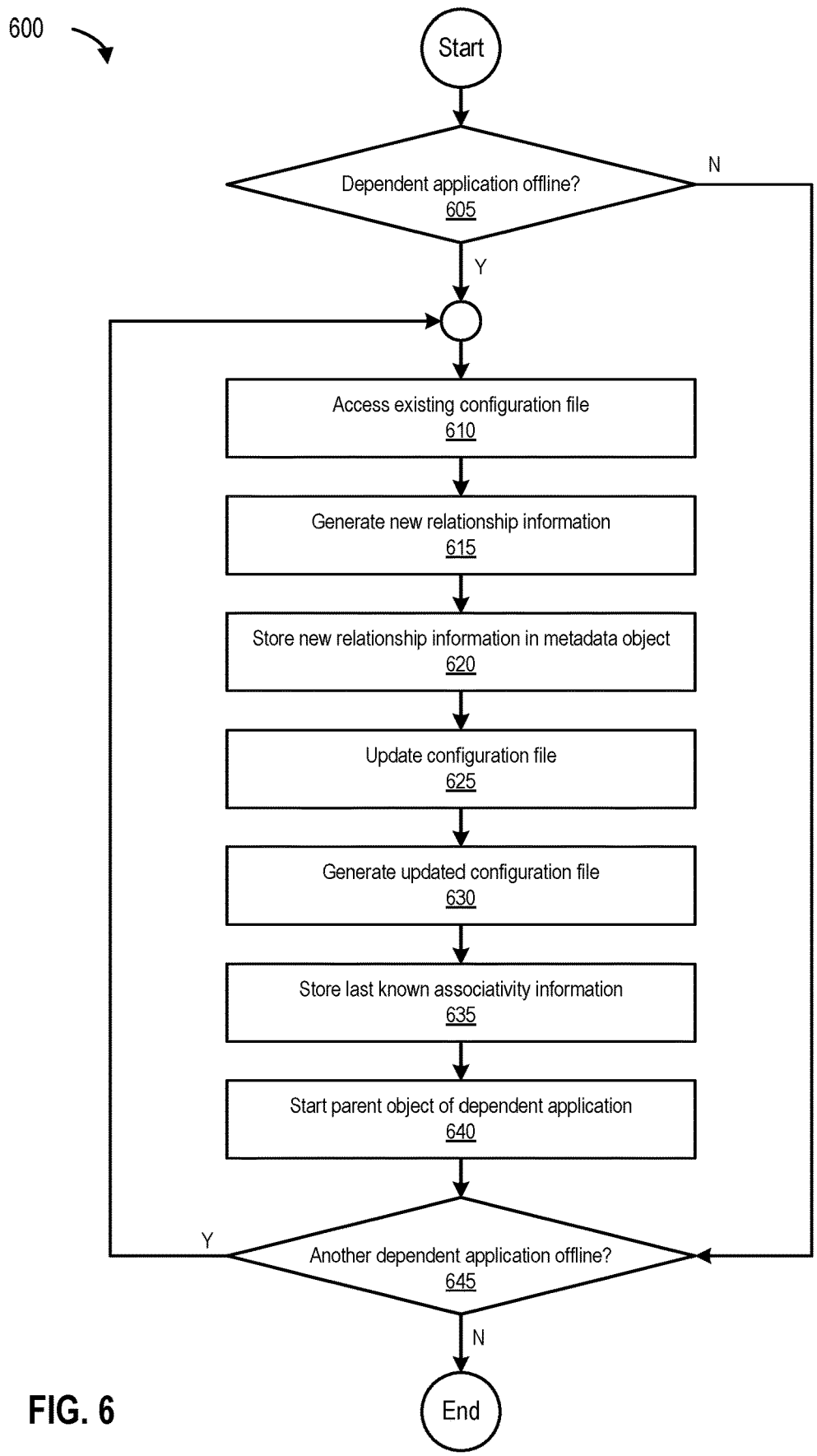
FIG. 6 is a flowchart 600 of a process for starting a parent object, according to one embodiment of the present disclosure.

FIG. 6 is a flowchart 600 of a process for starting a parent object, according to one embodiment. The process begins at 605 determining if a dependent application is offline. If the dependent application is not offline, the process ends. However, if the dependent application is offline, the process, at 610, accesses an existing configuration file. At 615, the process generates new relationship information (e.g., new association information 175(1)), and at 620, stores the new relationship information in a metadata object (e.g., metadata object 215(1)). At 625, the process updates the configuration file, and at 630, generates an updated configuration file. At 635, the process stores last known associativity information (e.g., last known association information 170(1)), and at 640, starts the parent object of the dependent application. At 645, the process determines if there is another dependent application offline. If there is another dependent application offline, the process loops to 610. Otherwise, the process ends.

Figure 7:
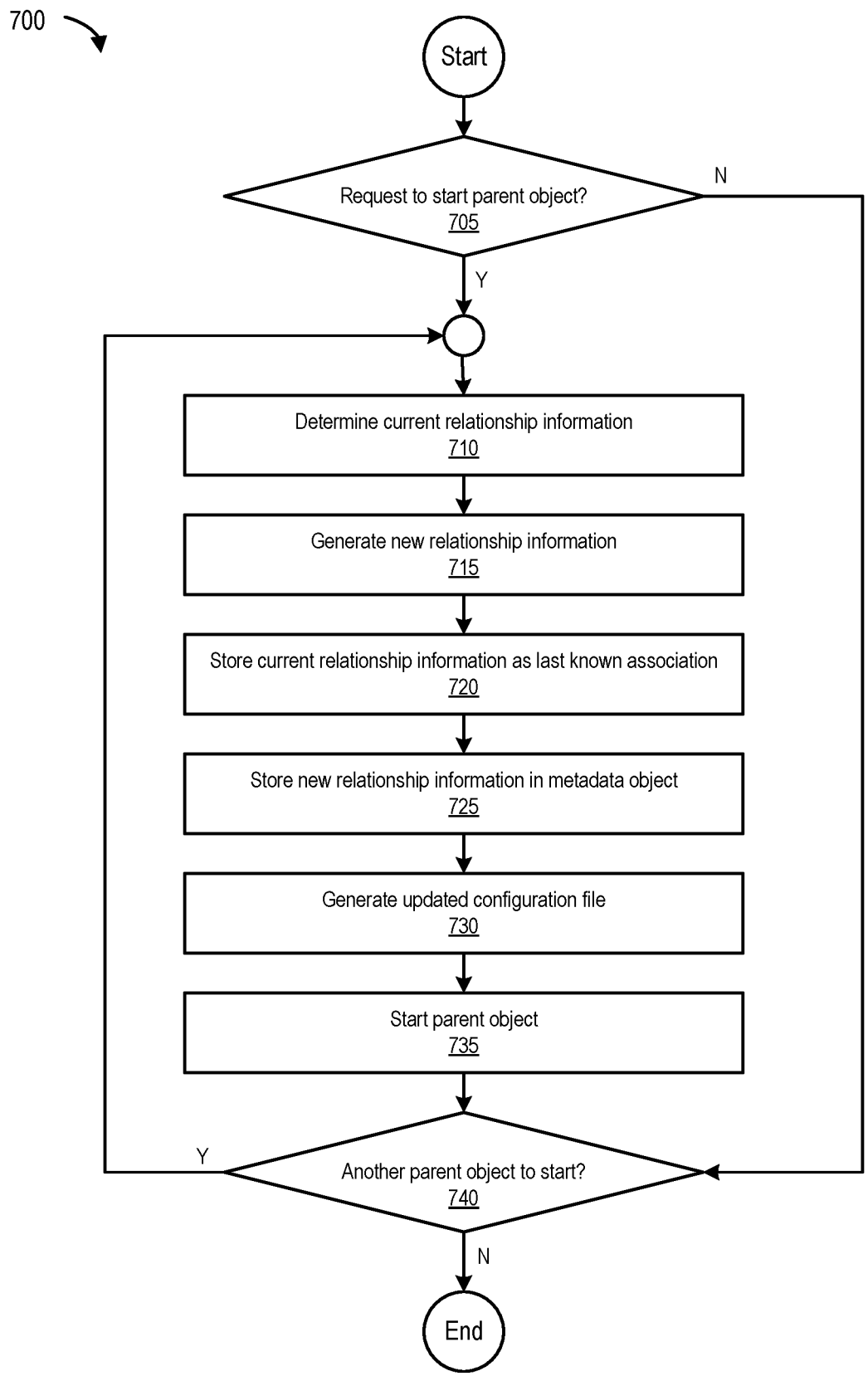
FIG. 7 is a flowchart 700 of another process for starting a parent object, according to one embodiment of the present disclosure.

FIG. 7 is a flowchart 700 of another process for starting a parent object, according to one embodiment. The process begins at 705 by determining if there is a request to start a parent object. If there is no request to start a parent object, the process ends. However, if there is a request to start a parent object, the process, at 710, determines current relationship information. At 715, the process generates new relationship information, and at 720, stores the current relationship information as the last known association. At 725, the process stores the new relationship information in a metadata object, and at 730, generates an updated configuration file. At 735, the process starts the parent object. At 740, the process determines if there is another parent object to start. If there is another parent object to start, the process loops to 710. Otherwise, the process ends.

Existing constructs in multitenant clustered environments at least require all child objects to be online before onlining a parent object (even for soft dependencies). In such existing constructs, any child suffices for onlining the parent object and no runtime configuration updates are provided. Therefore, it will be appreciated that in the proposed universal construct (e.g., universal construct 210(1) of FIG. 2A), all child objects need not be online to online a parent object (only the currently associated child object needs to be online). In addition, associativity can be changed on runtime and can be saved as part of the configuration file.

Therefore, it will be appreciated that, the methods, systems, and processes that are described herein employ constructs that permit flexible associativity of dependent applications in multitenant clustered environments.

Example Computing Environment

Figure 8:
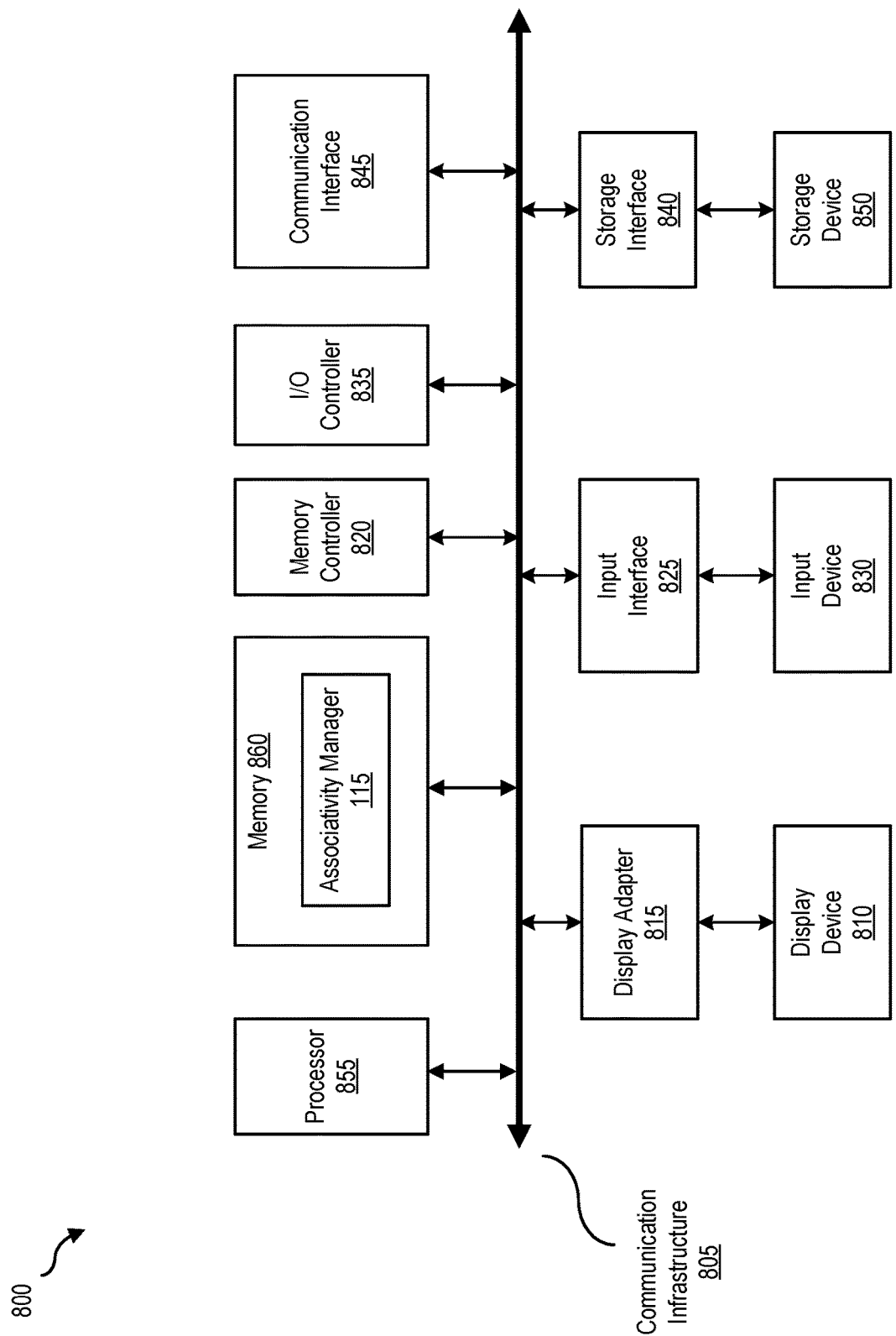
FIG. 8 is a block diagram of a computing system 800 that performs data replication between heterogeneous storage servers, according to one embodiment of the present disclosure.

FIG. 8 is a block diagram of a computing system 800 that permits flexible associativity of dependent applications in multitenant clustered environments, according to one embodiment. Computing system 800 can include cluster 105, nodes 110(1)-(N), hosts 305(1)-(N), and data centers 320(1)-(N), and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that generates at least a modified construct like universal construct 210(1), computing system 800 becomes a special purpose computing device that is configured to permit flexible associativity of dependent applications in multitenant clustered environments.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein.

Memory 860 (e.g., memory 205(1) of node 110(1)) generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one embodiment, program instructions implementing an associativity manager 115(1) may be loaded into memory 860.

In certain embodiments, computing system 800 may also include one or more components or elements in addition to processor 855 and/or memory 860. For example, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of nodes 110(1)-(N), hosts 305(1)-(N), and/or data centers 320(1)-(N). For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type or form of communication device or adapter capable of facilitating communication between computing system 800 and one or more other devices. Communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. All of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more embodiments disclosed herein may be encoded as a computer program (e.g., computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860 and/or various portions of storage device 850. When executed by processor 855, a computer program loaded into computing system 800 may cause processor 855 to perform and/or be a means for performing the functions of one or more of the embodiments described and/or illustrated herein. One or more of the embodiments described and/or illustrated herein may be implemented in firmware and/or hardware. For example, computing system 800 may be configured as an application specific integrated circuit (ASIC) adapted to implement one or more of the embodiments disclosed herein.

Example Networking Environment

Figure 9:
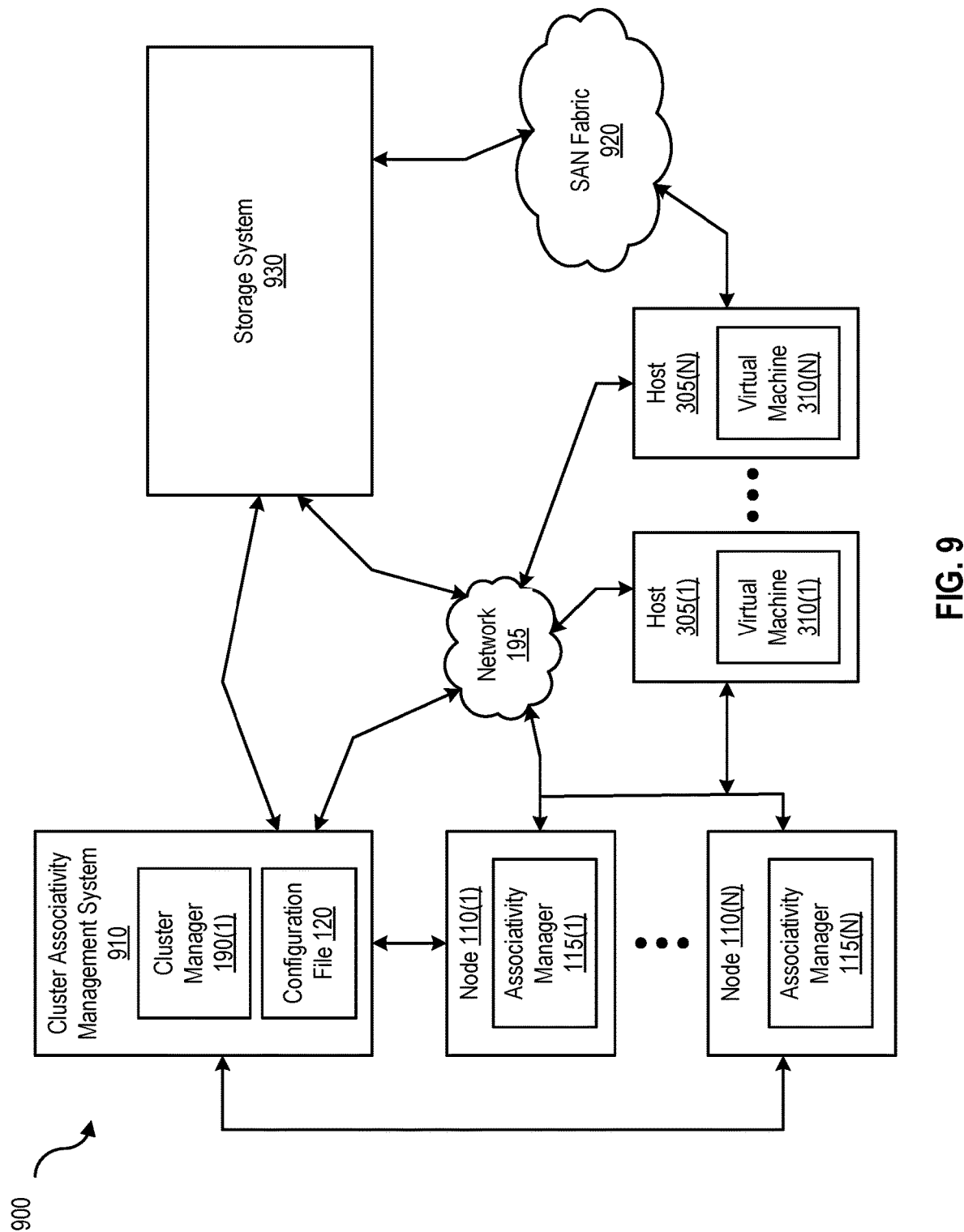
FIG. 9 is a block diagram of a network system 900, according to one embodiment of the present disclosure.

FIG. 9 is a block diagram of a networking system 900, according to one embodiment. In certain embodiments, network-attached storage (NAS) devices may be configured to communicate with nodes 110(1)-(N), hosts 305(1)-(N), data centers 320(1)-(N), and/or cluster associativity management system 910 using various protocols, such as Network File System (NFS), Server Message Block (SMB), or Common Internet File System (CIFS). Network 195 generally represents any type or form of computer network or architecture capable of facilitating communication between nodes 110(1)-(N), hosts 305(1)-(N), data centers 320(1)-(N), and/or cluster associativity management system 910.

In some embodiments, the cluster manager (e.g., cluster manager 190(1) or cluster manager 190(N)) need not be distributed, but can instead be at a single node (e.g., inside or outside a cluster), but associativity manager 115 and configuration file 120 can still be on each node (e.g., in cluster 105), though they could also be located independently and separately as well. In other embodiments, a copy of configuration file 120(1), once generated and/or updated, can be copied and distributed by cluster manager 190(1) or associativity manager 115(1) of node 110(1) to other nodes in cluster 105 (e.g., prior to node startup and/or runtime). In one embodiment, a single master configuration file can also be maintained by a master server or a cluster server within cluster 105.

In certain embodiments, a communication interface, such as communication interface 845 in FIG. 8, may be used to provide connectivity between nodes 110(1)-(N), hosts 305(1)-(N), data centers 320(1)-(N), and/or cluster associativity management system 910, and network 195. It should be noted that the embodiments described and/or illustrated herein are not limited to the Internet or any particular network-based environment. For example, network 195 can be a Storage Area Network (SAN). In some embodiments, cluster associativity management system 910 may be part of nodes 110(1)-(N), hosts 305(1)-(N), and/or data centers 320(1)-(N), or may be separate. If separate, cluster associativity management system 910 and cluster 105 may be communicatively coupled via network 195.

In one embodiment, all or a portion of one or more of the disclosed embodiments may be encoded as a computer program and loaded onto and executed by nodes 110(1)-(N), hosts 305(1)-(N), data centers 320(1)-(N), and/or cluster associativity management system 910, or any combination thereof. All or a portion of one or more of the embodiments disclosed herein may also be encoded as a computer program, stored on nodes 110(1)-(N), hosts 305(1)-(N), data centers 320(1)-(N), and/or cluster associativity management system 910, and distributed over network 195.

In some examples, all or a portion of nodes 110(1)-(N), hosts 305(1)-(N), data centers 320(1)-(N), and/or cluster associativity management system 910 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, associativity manager 115(1) may transform the behavior of node 110(1) in order to cause node 110(1) to permit the flexible associativity of dependent application 130(1) in cluster 105.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
   determining a rigidity associated with a dependent application, wherein
   the rigidity is one of a hard rigidity, a firm rigidity, or a soft rigidity, wherein
   the hard rigidity requires the dependent application to be taken offline if a first dependee application fails,
   the firm rigidity allows the dependent application to remain online and be associated with a second dependee application if the first dependee application fails, and
   the soft rigidity allows the dependent application to remain online and does not require the dependent application to be associated with any other dependee application if the first dependee application fails;
   detecting a failure of the first dependee application; and
   in response to detection of the failure, performing an appropriate action with respect to the dependent application, wherein
   the appropriate action comprises
   taking the dependent application offline, if the rigidity is the hard rigidity,
   associating the dependent application with the second dependee application, if the rigidity is the firm rigidity, and
   permitting the dependent application to continue to operate, if the rigidity is the soft rigidity.

2. The method of claim 1, wherein
   the dependent application is dependent on data received from the first dependee application.

3. The method of claim 1, wherein
   prior to the failure, the first dependee application was executing on a first node in a cluster and the dependent application was executing on a second node in the cluster.

4. The method of claim 3, further comprising:
   determining a locality requirement associated with the dependent application, wherein
   the locality requirement is determined using locality information that indicates a preference for either a local locality or a global locality,
   wherein
   the local locality indicates that, in the case of a failover or migration of the dependent application, preference should be given to another dependee application that is operating on the first node, and
   the global locality indicates that, in the case of a failover or migration of the dependent application, the dependee application can be migrated to a different node in the cluster.

5. The method of claim 4, wherein
   the appropriate action further comprises
   associating the dependent application with the another dependee application, if the locality parameter indicates the preference is the local locality, and
   migrating the dependent application to the different node, if the locality parameter indicates the preference is the global locality.

6. The method of claim 1, further comprising:
   subsequent to determining that the dependent application has the hard rigidity and to taking the dependent application offline, determining that the dependee application has been brought back online; and
   subsequent to determining that the dependee application has been brought back online, bringing the dependent application back online.

7. The method of claim 1, wherein:
   the first dependee application and the second dependee application are both container applications,
   the dependent application is a pluggable application, and
   the pluggable application is a production database.

8. The method of claim 1, wherein:
   at least one of the first dependee application, the second dependee application, or the dependent application are configured to be executed by a virtual machine.

9. A non-transitory computer-readable storage medium comprising program instructions executable to perform a method comprising:
   determining a rigidity associated with a dependent application, wherein
   the rigidity is one of a hard rigidity, a firm rigidity, or a soft rigidity, wherein
   the hard rigidity requires the dependent application to be taken offline if a first dependee application fails,
   the firm rigidity allows the dependent application to remain online and be associated with a second dependee application if the first dependee application fails, and
   the soft rigidity allows the dependent application to remain online and does not require the dependent application to be associated with any other dependee application if the first dependee application fails;
   detecting a failure of the first dependee application; and
   in response to detection of the failure, performing an appropriate action with respect to the dependent application, wherein
   the appropriate action comprises
   taking the dependent application offline, if the rigidity is the hard rigidity,
   associating the dependent application with the second dependee application, if the rigidity is the firm rigidity, and
   permitting the dependent application to continue to operate, if the rigidity is the soft rigidity.

10. The non-transitory computer-readable storage medium of claim 9, wherein
    the dependent application is dependent on data received from the first dependee application.

11. The non-transitory computer-readable storage medium of claim 9, wherein
    prior to the failure, the first dependee application was executing on a first node in a cluster and the dependent application was executing on a second node in the cluster.

12. The non-transitory computer-readable storage medium of claim 11, wherein the method further comprises:
    determining a locality requirement associated with the dependent application, wherein
    the locality requirement is determined using locality information that indicates a preference for either a local locality or a global locality,
    wherein
    the local locality indicates that, in the case of a failover or migration of the dependent application, preference should be given to another dependee application that is operating on the first node, and
the global locality indicates that, in the case of a failover or migration of the dependent application, the dependee application can be migrated to a different node in the cluster.

13. The non-transitory computer-readable storage medium of claim 12, wherein
the appropriate action further comprises
associating the dependent application with the another dependee application, if the locality parameter indicates the preference is the local locality, and
migrating the dependent application to the different node, if the locality parameter indicates the preference is the global locality.

14. The non-transitory computer-readable storage medium of claim 9, wherein the method further comprises:
subsequent to determining that the dependent application has the hard rigidity and to taking the dependent application offline, determining that the dependee application has been brought back online; and
subsequent to determining that the dependee application has been brought back online, bringing the dependent application back online.

15. The non-transitory computer-readable storage medium of claim 9, wherein:
the first dependee application and the second dependee application are both container applications,
the dependent application is a pluggable application,
the pluggable application is a production database, and
at least one of the first dependee application, the second dependee application, or the dependent application are configured to be executed by a virtual machine.

16. A system comprising:
one or more processors; and
a memory coupled to the one or more processors, wherein the memory stores program instructions executable by the one or more processors to perform a method comprising:
determining a rigidity associated with a dependent application, wherein
the rigidity is one of a hard rigidity, a firm rigidity, or a soft rigidity, wherein
the hard rigidity requires the dependent application to be taken offline if a first dependee application fails,
the firm rigidity allows the dependent application to remain online and be associated with a second dependee application if the first dependee application fails, and
the soft rigidity allows the dependent application to remain online and does not require the dependent application to be associated with any other dependee application if the first dependee application fails;

detecting a failure of the first dependee application; and
in response to detection of the failure, performing an appropriate action with respect to the dependent application, wherein
the appropriate action comprises
taking the dependent application offline, if the rigidity is the hard rigidity,
associating the dependent application with the second dependee application, if the rigidity is the firm rigidity, and
permitting the dependent application to continue to operate, if the rigidity is the soft rigidity.

17. The system of claim 16, wherein
the dependent application is dependent on data received from the first dependee application; and
prior to the failure, the first dependee application was executing on a first node in a cluster and the dependent application was executing on a second node in the cluster.

18. The system of claim 17, wherein the method further comprises:
determining a locality requirement associated with the dependent application, wherein
the locality requirement is determined using locality information that indicates a preference for either a local locality or a global locality,
wherein
the local locality indicates that, in the case of a failover or migration of the dependent application, preference should be given to another dependee application that is operating on the first node, and
the global locality indicates that, in the case of a failover or migration of the dependent application, the dependee application can be migrated to a different node in the cluster.

19. The system of claim 18, wherein
the appropriate action further comprises
associating the dependent application with the another dependee application, if the locality parameter indicates the preference is the local locality, and
migrating the dependent application to the different node, if the locality parameter indicates the preference is the global locality.

20. The system of claim 16, wherein the method further comprises:
subsequent to determining that the dependent application has the hard rigidity and to taking the dependent application offline, determining that the dependee application has been brought back online; and
subsequent to determining that the dependee application has been brought back online, bringing the dependent application back online.

* * * * *